(12) United States Patent
Ito et al.

(10) Patent No.: US 7,316,755 B2
(45) Date of Patent: Jan. 8, 2008

(54) METHOD OF PRODUCING MULTI-TERMINAL TYPE LAMINATED CERAMIC ELECTRONIC COMPONENT

(75) Inventors: Tsuyoshi Ito, Takefu (JP); Masaaki Taniguchi, Fukui-ken (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 10/896,894

(22) Filed: Jul. 23, 2004

(65) Prior Publication Data
US 2005/0067086 A1 Mar. 31, 2005

(30) Foreign Application Priority Data
Sep. 29, 2003 (JP) ............... 2003-337736

(51) Int. Cl.
H01G 4/012 (2006.01)
H01G 4/12 (2006.01)
C03B 29/00 (2006.01)

(52) U.S. Cl. .................. 156/89.16; 156/89.12; 361/321.3

(58) Field of Classification Search ............. 361/306.3, 361/309, 321.2, 321.3, 321.4, 321.5; 156/89.14
See application file for complete search history.

(56) References Cited

U.S. PATENT DOCUMENTS

| | | | | |
|---|---|---|---|---|
| 3,192,086 A | * | 6/1965 | Gyurk ..................... | 156/89.14 |
| 4,328,530 A | * | 5/1982 | Bajorek et al. ............. | 361/762 |
| 4,347,650 A | * | 9/1982 | Mc Larney et al. ....... | 29/25.42 |
| 4,831,494 A | * | 5/1989 | Arnold et al. ............ | 361/306.3 |
| 5,405,466 A | * | 4/1995 | Naito et al. ............... | 156/89.17 |
| 5,758,395 A | * | 6/1998 | Lenzen et al. ............. | 28/191 |
| 5,880,925 A | * | 3/1999 | DuPre et al. .............. | 361/303 |
| 6,091,598 A | * | 7/2000 | Kobayashi ................. | 361/303 |
| 6,191,932 B1 | * | 2/2001 | Kuroda et al. ............. | 361/303 |
| 6,292,351 B1 | * | 9/2001 | Ahiko et al. ............. | 361/306.3 |
| 6,370,010 B1 | * | 4/2002 | Kuroda et al. ........... | 361/306.1 |
| 6,430,025 B2 | * | 8/2002 | Naito et al. ................. | 361/303 |
| 6,657,848 B2 | * | 12/2003 | Togashi et al. .......... | 361/306.3 |
| 6,956,730 B2 | * | 10/2005 | Togashi ..................... | 361/309 |
| 2003/0011963 A1 | * | 1/2003 | Ahiko et al. ............. | 361/321.2 |
| 2004/0057192 A1 | * | 3/2004 | Galvagni et al. ......... | 361/306.3 |
| 2004/0125540 A1 | * | 7/2004 | Vieweg et al. ........... | 361/306.3 |
| 2004/0218344 A1 | * | 11/2004 | Ritter et al. ............. | 361/306.3 |

FOREIGN PATENT DOCUMENTS

| | | | |
|---|---|---|---|
| JP | 61-183913 | * | 8/1986 |
| JP | 64-14912 | * | 1/1989 |

(Continued)

*Primary Examiner*—Melvin Mayes
(74) *Attorney, Agent, or Firm*—Keating & Bennett, LLP

(57) ABSTRACT

In a method of producing a multi-terminal type laminated ceramic electronic component in which internal electrodes are embedded in a sintered ceramic member, and the internal electrodes have plural first lead-out electrodes led out to a first side surface and plural second lead-out electrodes led out to a second side surface, the plural second lead-out electrodes of one of the adjacent internal electrodes in each internal electrode pattern are not continuous with the plural first lead-out electrodes of the other of the adjacent internal electrodes, and the plural second lead-out electrodes and the plural first lead-out electrodes are alternately arranged in a direction that is substantially perpendicular to the direction of a line connecting the first and second side surfaces.

24 Claims, 18 Drawing Sheets

FOREIGN PATENT DOCUMENTS

| | | | |
|---|---|---|---|
| JP | 02-256216 | | 10/1990 |
| JP | 5-36569 | * | 2/1993 |
| JP | 2000-252160 | * | 9/2000 |
| JP | 2001-15373 | * | 1/2001 |
| JP | 2002-184647 | * | 6/2002 |
| JP | 2003-272945 | * | 9/2003 |

* cited by examiner

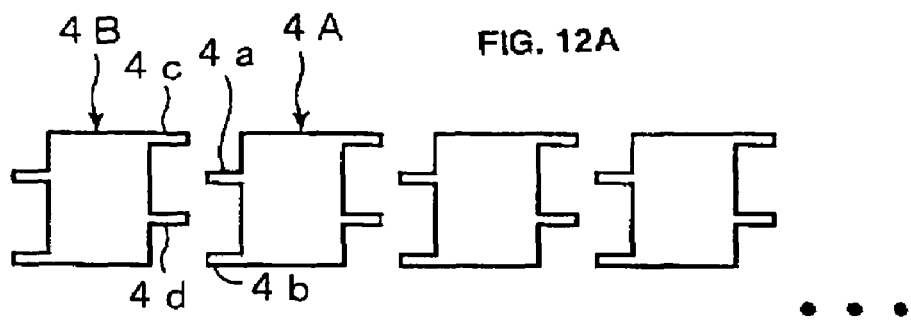
FIG. 12A
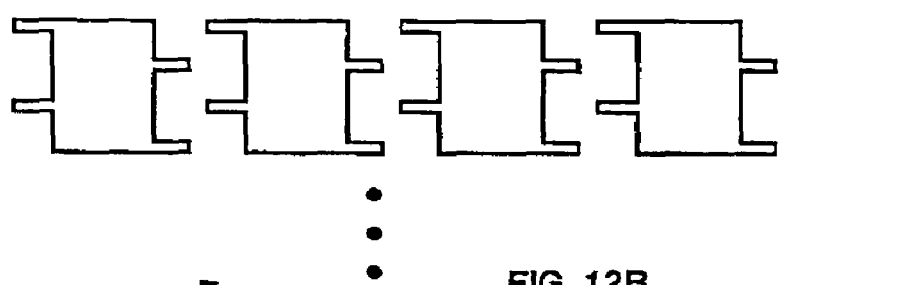
FIG. 12B
FIG. 12C
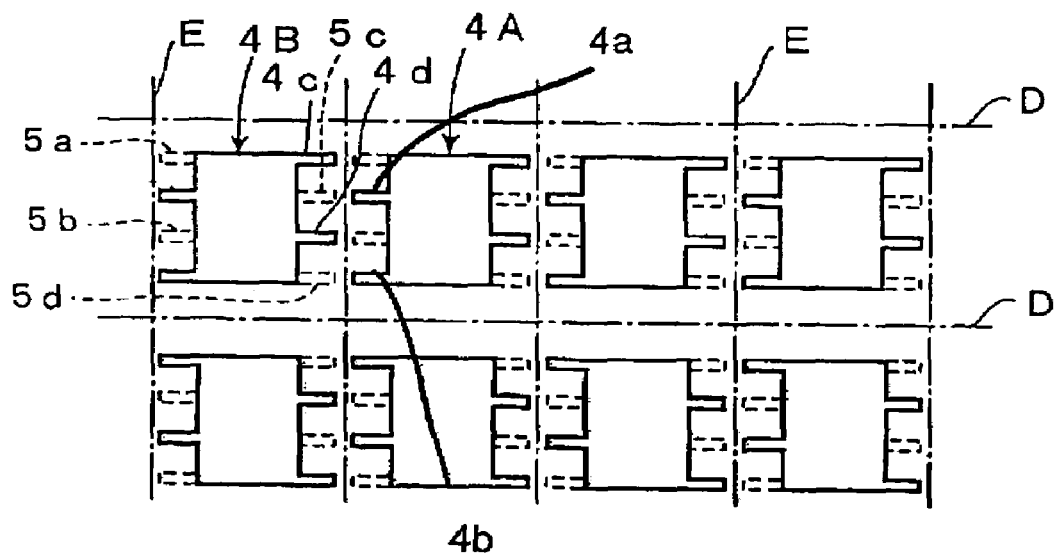

METHOD OF PRODUCING MULTI-TERMINAL TYPE LAMINATED CERAMIC ELECTRONIC COMPONENT

BACKGROUND OF THE INVENTION

1. Field of the Invention

The present invention relates to a method of producing a multi-terminal type laminated ceramic electronic component such as a multi-terminal monolithic ceramic capacitor or other suitable device, and in particular, to a method of producing a multi-terminal type laminated ceramic electronic component, the method using an internal electrode pattern in which the shapes of lead-out electrodes which are continuous with an internal electrode are significantly improved.

2. Description of the Related Art

Previously, a variety of multi-terminal type laminated ceramic electronic components have been proposed in which a plurality of internal electrodes connected to plural terminal electrodes are laminated to each other via ceramic layers. For example, in Japanese Unexamined Patent Application Publication No. 2-256216, FIG. 16 schematically shows a multi-terminal type monolithic ceramic capacitor 101. As shown in FIG. 16, a plurality of internal electrodes 103 to 108 are laminated via ceramic layers within a sintered member 102 of the multi-terminal monolithic ceramic capacitor 101. The respective internal electrodes 103 to 108 have lead-out electrodes 103a, 103b to 108a, 108b which are led out to the upper surface of the sintered member 102.

The internal electrodes 103 to 108 are plural lead-out electrodes (not shown) which are led-out to the lower surface of the sintered member 102.

The lead-out electrodes of internal electrodes 103 to 108 adjacent to each other in the lamination direction are alternately shifted from each other. For example, the lead-out electrodes 103a and 103b of the internal electrode 103 are shifted from the lead-out electrodes 104a and 104b of the internal electrode 104. Moreover, the lead-out electrodes 105a and 105b of the internal electrode 105 are positioned so as to overlap the lead-out electrodes 103a and 103b of the internal electrode 103 in the lamination direction.

In the monolithic ceramic capacitor 101, four terminal electrodes are provided on the upper surface of the ceramic sintered member 102. In particular, a first terminal electrode is arranged so as to be electrically connected to the lead-out electrodes 104a, 106a, and 108a of the internal electrodes 104, 106, and 108. On the other hand, a second terminal electrode is arranged so as to be electrically connected to the lead-out electrodes 103a, 105a, and 107a of the internal electrodes 103, 105, and 107. A third terminal electrode is arranged so as to be electrically connected to the lead-out electrodes 104b, 106b, and 108b of the internal electrodes 104, 106, and 108. A fourth terminal electrode is arranged so as to be electrically connected to the lead-out electrode portions 103b, 105b, and 107b of the internal electrodes 103, 105, and 107.

Accordingly, the directions of electric currents flowing in adjacent internal electrodes, e.g., in the internal electrodes 103 and 104, can be set to be opposite to each other by electrical connection of the first and third terminal electrodes to the "hot" side, and also by electrical connection of the second and fourth terminal electrodes to a ground electrode. Therefore, magnetic fluxes generated by the flowing of currents in the adjacent internal electrodes can cancel each other out. Therefore, the equivalent series inductances can be reduced.

Laminated ceramic electronic components such as the monolithic ceramic capacitor 101 are produced by a method in which a plurality of internal electrodes each having plural lead-out electrodes are laminated to each other via laminated ceramic layers, a mother laminate is formed and is cut into laminate chips which are the units of the laminated ceramic electronic component, and then, the laminate chips are fired.

In the formation of the mother laminate, electroconductive paste is screen-printed on a mother ceramic green sheet, so that a mother internal electrode pattern is formed.

FIGS. 17A and 17B are schematic plan views showing mother internal electrode patterns printed on mother ceramic green sheets which are set adjacently to each other in the lamination direction when the above-described type of a laminated ceramic electronic component is produced. In particular, a mother internal electrode pattern 111 shown in FIG. 17A is printed on one of the mother ceramic green sheets. A mother internal electrode pattern 112 shown in FIG. 17B is printed on the second mother ceramic green sheet which is laminated onto the mother ceramic green sheet having the internal electrode pattern 111 printed thereon. A plurality of portions 113 each forming one internal electrode for use in one laminated ceramic electronic component are formed in the mother internal electrode pattern 111. Similarly, a plurality of portions each forming one internal electrode 114 for use in one laminated electronic component are printed on the mother internal electrode pattern 112.

The internal electrodes 113 and 114 are arranged such that when they are laminated to each other, the lead-out electrodes 113a and 113b do not overlap the lead-out electrodes 114a and 114b, and moreover, the lead-out electrodes 113c and 113d do not overlap the lead-out electrodes 114c and 114d, respectively. In the mother internal electrode pattern 111, an internal electrode 113 and the internal electrode 113A adjacent to the internal electrode 113 are formed such that the lead-out electrodes thereof are not continuous with each other. That is, the lead-out electrodes 113c and 113d of the internal electrode 113 are formed so as to be continuous with the lead-out electrodes 113a and 113b of the internal electrode 113A. As described above, the lead-out electrodes of adjacent internal electrodes are formed so as to be continuous with each other. The reason lies in that when a plurality of the mother ceramic green sheets are laminated to each other and cut in the lamination direction, the lead-out electrodes are assuredly exposed to the side surfaces of the laminate chips which are formed by the cutting.

However, the following problem occurs. When the mother internal electrode pattern 111 is printed, e.g., in the direction shown by arrow X in FIG. 18 by screen printing using electroconductive paste, the printed internal electrode pattern spreads as shown by arrow A in FIG. 18, and thus, the shape of the internal electrodes can not be exactly printed. In particular, if the screen-printing is carried out in the direction shown by the arrow X in FIG. 18, window portions C at which the outer peripheral edges are surrounded by the internal electrode pattern are formed, since the lead-out electrodes of, e.g., the internal electrode 113 and the internal electrode 113A are continuous with each other. Thus, in the case in which portions surrounded by the internal electrode pattern and not coated with the internal electrode conductive paste exist, the applied conductive paste can not be further extended, and thus, tends to undesirably spread, as shown by the arrow A.

Thus, it has been difficult to produce a laminated ceramic electronic component having desired internal electrodes printed with high accuracy.

SUMMARY OF THE INVENTION

In order to overcome the problems described above, preferred embodiments of the present invention provide a method of producing a multi-terminal type laminated ceramic electronic component provided with a plurality of internal electrodes each having plural lead-out electrodes, the internal electrodes being laminated to each other via ceramic layers, in which in the formation of a mother laminate, the printing accuracy of an internal electrode pattern can be effectively enhanced, and thereby, desired internal electrodes can be formed with high accuracy.

According to a first preferred embodiment of the present invention, a method of producing a multi-terminal type laminated ceramic electronic component which includes a sintered ceramic member having a plurality of internal electrodes embedded therein, plural first terminal electrodes formed on a first side surface of the sintered ceramic member, and plural second terminal electrodes formed on a second side surface of the sintered ceramic member opposed to the first side surface, the internal electrodes each having plural first lead-out electrodes led out to the first side surface and plural second lead-out electrodes led out to the second side surface, the method including the steps of preparing a mother green sheet having an internal electrode pattern printed thereon, the internal electrode pattern having a plurality of the internal electrodes formed in a matrix pattern, laminating a plurality of the mother ceramic green sheets, and laminating mother ceramic green sheets having no internal electrode patterns printed thereon onto the upper and lower surfaces of the formed laminate, whereby a mother laminate is formed, cutting the mother laminate in the thickness direction thereof, whereby laminate chips which are the respective multi-terminal type laminated ceramic electronic component units are formed, firing the laminate chips whereby the sintered ceramic members are formed, and forming the first and second terminal electrodes before or after the firing of the laminate chips, the plural second lead-out electrodes of one of adjacent internal electrodes in each internal electrode pattern not being continuous with the first lead-out electrode of the other internal electrode, the second lead-out electrodes and the first lead-out electrodes being alternately arranged in the direction of an extending line of the first and second side surfaces. Thus, a window portion which exists between a pair of adjacent internal electrodes and is surrounded by an area where electroconductive paste is applied is not formed. Therefore, when internal electrodes are formed by screen-printing using conductive paste, the printed figures of the internal eletrode are prevented from spreading. Thus, the internal electrodes can be printed with high accuracy. Accordingly, a multi-terminal type laminated ceramic electronic component of which the dispersion of the characteristics is very small, and adjacent internal eletrodes are prevented from being short-circuited can be provided.

According to a second preferred embodiment of the present invention, a method of producing a multi-terminal type laminated ceramic electronic component which includes a sintered ceramic member having a plurality of internal electrodes embedded therein, plural first terminal electrodes formed on a first side surface of the sintered ceramic member, and plural second terminal electrodes formed on the second side surface opposed to the first side surface, the internal electrodes each having plural first lead-out electrodes led out to the first side surface and a second lead-out electrode led out to the second side surface, the method including the steps of preparing a mother green sheet having an internal electrode pattern printed thereon, the internal electrode pattern having a plurality of the internal electrodes formed in matrix pattern, laminating a plurality of the mother ceramic green sheets, and laminating mother ceramic green sheets having no internal electrode patterns printed thereon onto the upper and lower surfaces of the formed laminate, whereby a mother laminate is formed, cutting the mother laminate in the thickness direction thereof, whereby laminate chips which are the respective multi-terminal type laminated ceramic electronic component units are formed, firing the laminate chips whereby the sintered ceramic members are formed, and forming the first and second terminal electrodes before or after the firing of the laminate chips, the plural second lead-out electrodes of one of adjacent internal electrodes in each internal eletrodes pattern not being continuous with the first lead-out electrode of the other internal electrode, the tips of the lead-out electrodes of the one internal electrode being extended so as to position between the lead-out electrodes of the other internal electrode. As in the production method according to the first preferred embodiment of the present invention, when the internal electrode pattern is formed by screen-printing, the printed figures of the internal electrodes can be prevented from spreading. Moreover, the tips of the lead-out electrodes of the one internal electrode are extended so as to be located between the lead-out electrodes of the other internal electrode. Therefore, when the mother ceramic sintered member is cut, the lead-out electrodes of the internal electrodes can be reliably exposed at the surfaces formed by the cutting. Moreover, the top portions of the lead-out electrodes formed, when the are cut, remain as dummy eletrodes in the adjacent laminate chip. Thus, the dummy electrodes are electrically connected to the terminal electrodes. Thus, the bonding strengths of the between the terminal electrodes and the sintered ceramic member can be greatly improved.

According to a third preferred embodiment of the invention, a method of producing a multi-terminal type laminated ceramic electronic component which includes a sintered ceramic member having a plurality of internal electrodes embedded therein, plural first terminal electrodes formed on a first side surface of the sintered ceramic member, amd plural second terminal electrodes formed on the second side surface opposed to the first side surface, the internal electrodes each having plural first lead-out electrodes led out to the first side surface and a second lead-out electrode led out to the second side surface, the method including the steps of preparing a mother green sheet having an internal electrode pattern printed thereon, the internal electrode pattern having a plurality of the internal electrodes formed in a matrix pattern, laminating a plurality of the mother ceramic green sheets, and laminating mother ceramic green sheets having no internal electrode pattern printed thereon onto the upper and lower sides of the formed laminate, whereby a mother laminate is formed, cutting the mother laminate in the thickness direction thereof, whereby laminate chips which are the respective multi-terminal type laminated ceramic electronic component units are formed, firing the laminate chips whereby the sintered ceramic members are formed, and forming the first and second terminal electrodes before or after the firing of the laminate chips, the plural second lead-out electrodes of one of adjacent internal electrodes in each internal electrode pattern not being continuous with the first lead-out electrode of the other internal electrode, the tips of the lead-out electrodes of the one internal electrode being extended so as not to be located between the lead-out electrodes of the other internal electrode. Also, in this case, no window portion is formed. Accordingly, the internal electrodes can be printed with very high accuracy. Moreover, since the tips of the lead-out electrodes of one internal electrode are not positioned between the lead-out electrodes of the adjacent electrode, the top portions of the lead-out electrodes of an upper internal electrode do not overlap those of the lead-out electrodes of the lower internal electrode. Therefore, when the mother laminate is pressed and cut, the pressing is prevented from partially applying a large pressure to the top portions of the lead-out electrodes of the internal electrodes. Thus, the top portions of the lead-out electrodes are reliably prevented from being distorted. Moreover, since a large pressure is prevented from being applied to the top portions of the lead-out electrodes, interlayer delamination phenomena in the cut-surfaces are prevented.

Preferably, regarding the lamination of a plurality of the mother ceramic green sheets having the internal electrode patterns formed thereon, a plurality of the mother ceramic green sheets are laminated such that the positions of the first and second lead-out electrodes of an internal electrode in the internal electrode pattern of an upper layer are shifted in the direction where the first and second side surfaces are extended, from the positions of the first and second lead-out electrodes of the internal electrode formed at the corresponding position in the internal electrode pattern of the lower layer. Thus, the lead-out electrodes connected to different potentials are alternately arranged on the side surfaces. Thus, a laminated ceramic electronic component having a low equivalent series resistance can be provided.

Also, preferably, the sintered member further has first and second end surfaces connecting the first and second side surfaces, and the internal electrodes each have third and fourth lead-out electrodes led out to the first and second end surfaces. Accordingly, a laminated ceramic electronic component having more terminals can be provided.

Other features, elements, steps, characteristics and advantages of the present invention will become more apparent from the following detailed description of preferred embodiments with reference to the attached drawings.

BRIEF DESCRIPTION OF THE DRAWINGS

FIGS. 12A and 12B are plan views of the internal electrode patterns printed on the first and second mother ceramic green sheets formed according to the fourth preferred embodiment of the present invention;

FIG. 12C is a schematic plan view showing the lamination-state of the internal electrodes in the mother laminate formed according to the fourth preferred embodiment of the present invention;

DETAILED DESCRIPTION OF PREFERRED EMBODIMENTS

The present invention will be made more apparent from the following description of preferred embodiments of the present invention.

First Preferred Embodiment

Figure 2:
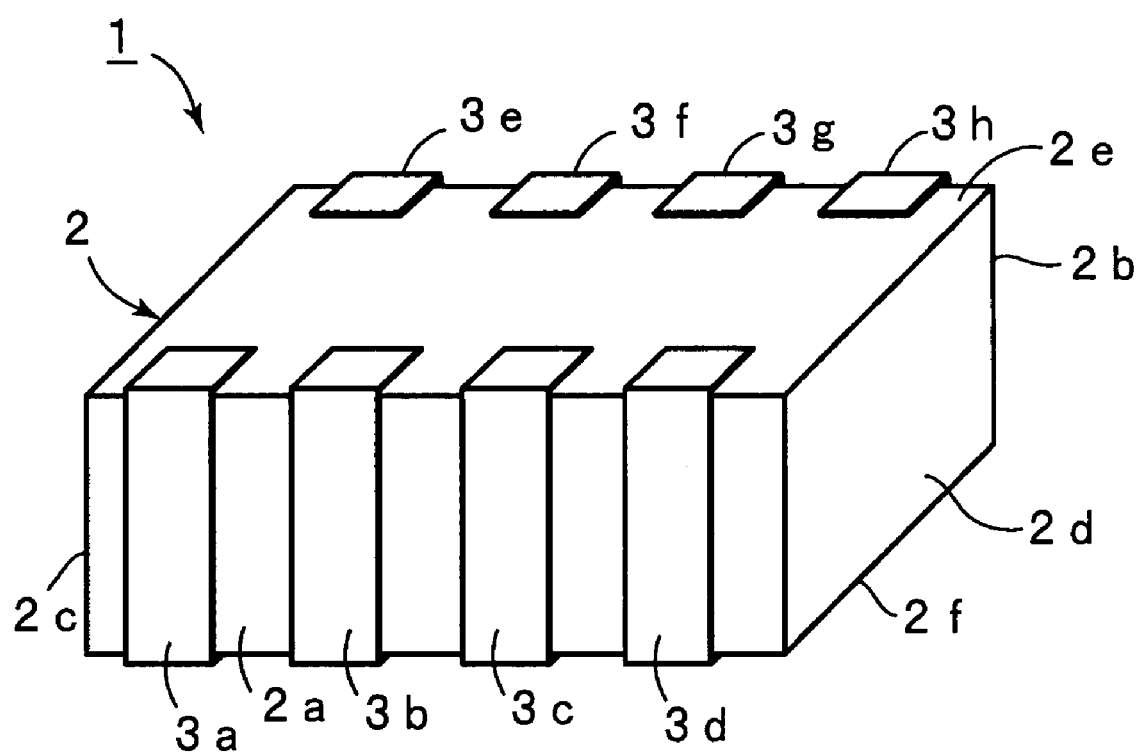
FIG. 2 is a perspective view showing the appearance of the multi-terminal type monolithic ceramic capacitor which is formed according to the first preferred embodiment of the present invention.

FIG. 2 is a perspective view of a multi-terminal type monolithic ceramic capacitor as a multi-terminal type laminated ceramic electronic component produced according to a first preferred embodiment of the present invention. The multi-terminal monolithic ceramic capacitor 1 includes a sintered member 2. The shape of the sintered member 2 is preferably substantially rectangular and has a first side surface 2a and a second side surface 2b opposed to each other, side surfaces 2c and 2d, an upper surface 2e and a lower surface 2f.

First terminal electrodes 3a to 3d are formed on the first surface 2a. Second terminal electrodes 3e to 3h are formed on the second side surface 2b. The terminal electrodes 3a to 3d formed on the first side surface 2a are opposed to the terminal electrodes 3e to 3h formed on the second side surface 2b via the sintered member 2.

Figure 3A:
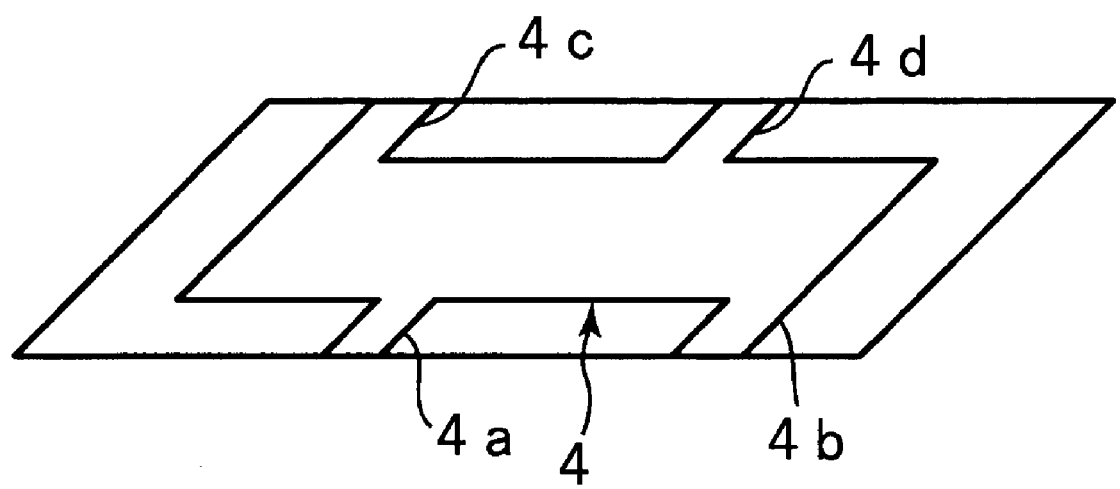
FIGS. 3A and 3B are schematic perspective views illustrating the lamination state of the first and second internal electrodes of the multi-terminal type monolithic ceramic capacitor shown in FIG. 2.
Figure 3B:
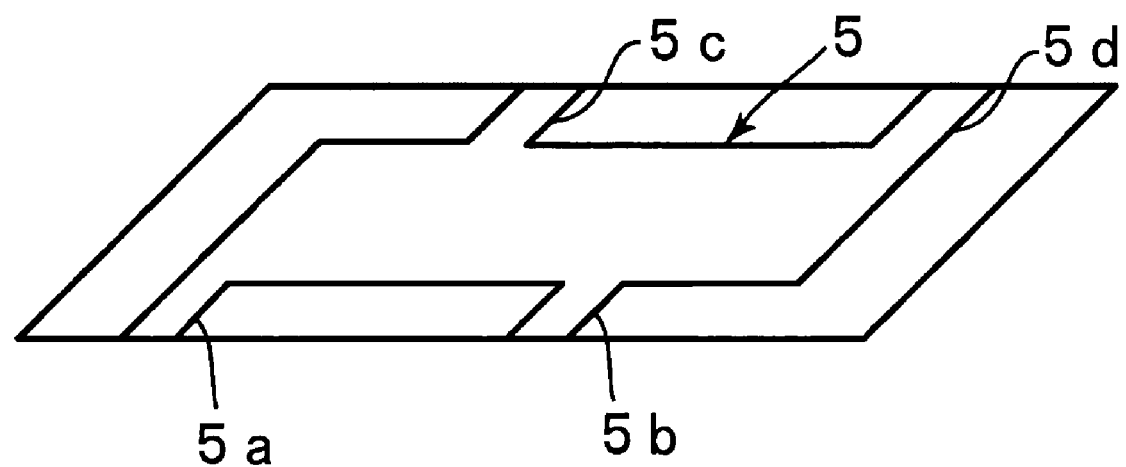

A plurality of internal electrodes are formed inside of the sintered member 2. FIGS. 3A and 3B are schematic views showing a pair of internal electrodes overlapping each other via a ceramic layer in the sintered member 2. That is, the internal electrode 3 shown in FIG. 3A is arranged so as to overlap the internal electrode 5 shown in FIG. 3B via the ceramic layer. The internal electrode 4 includes lead-out electrodes 4a and 4b led out to the side surface 2a, and lead-out electrodes 4c and 4d led out to the side surface 2b. The lead-out electrodes 4a and 4b are electrically connected to the terminal electrodes 3b and 3d shown in FIG. 2. The lead-out electrodes 4c and 4d are electrically connected to the terminal electrodes 3e and 3g located on the side surface 2b.

On the other hand, the internal electrode 5 includes lead-out electrodes 5a and 5b led out to the side surface 2a, and lead-out electrodes 5c and 5d led out to the side surface 2b. The lead-out electrodes 5a and 5b are electrically connected to the terminal electrodes 3a and 3c shown in FIG. 2. The lead-out electrodes 5c and 5d are electrically connected to the terminal electrodes 3f and 3h provided on the side surface 2b.

The internal electrodes 4 and the internal electrodes 5 are alternately arranged in the thickness direction, i.e., the lamination direction.

In the multi-terminal monolithic ceramic capacitor 1, for example, the terminal electrodes 3a, 3c, 3f, and 3h are connected to a hot-side potential. The terminal electrodes 3b, 3d, 3e, and 3g are connected to a ground-side potential. Accordingly, the directions of currents flowing through the internal electrodes 4 and 5 are opposite to each other. Hence, magnetic fluxes that are generated when the currents flow the upper and lower internal electrodes 4 and 5 cancel each other out. Moreover, the distances between the terminal electrodes 3a, 3c and the terminal electrodes 3b and 3c are small. That is, the distances between the terminal electrodes connected to the different potentials are short. Thus, the paths through which currents flow in the internal electrodes 4 and 5 are set to be short.

Therefore, the equivalent series inductance ESL in the multi-terminal monolithic ceramic capacitor 1 can be greatly reduced.

A multi-terminal monolithic ceramic capacitor of which the ESL is low can be produced with high accuracy. This will be described with reference to FIG. 1 and FIGS. 4 to 6.

For production of the multi-terminal monolithic ceramic, capacitor 1, mother ceramic green sheets are prepared. An internal electrode pattern including a plurality of internal electrodes arranged in a matrix is formed on each of the prepared mother ceramic green sheets preferably by screen-printing using conductive paste. The shape of the internal electrodes in one row of the matrix pattern is different from a shape of the internal electrodes in an adjacent row of the matrix pattern, each of the internal electrodes in the one row has substantially the same shape, and each of the internal electrodes in the adjacent row has substantially the same shape. In this case, first and second mother ceramic green sheets are prepared. On the first mother ceramic green sheet, an internal electrode pattern to form a plurality of internal electrodes 4 is formed. On the second mother ceramic green sheet, an internal electrode pattern to form a plurality of internal electrodes 5 is formed. In addition to these mother green sheets, mother ceramic green sheets having no internal electrode patterns are prepared.

Figure 1A:
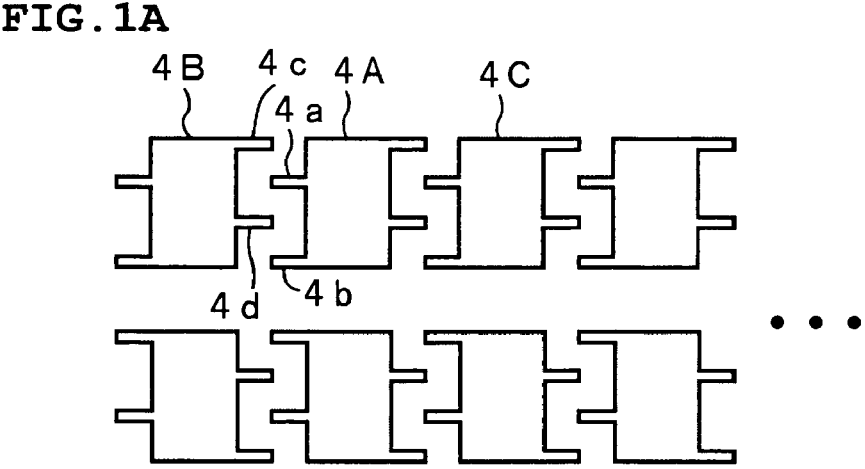
FIGS. 1A and 1B are schematic plan views of internal electrode patterns printed on first and second mother ceramic green sheets according to a first preferred embodiment of the present invention.

The internal electrode pattern shown in FIG. 1A is formed on the first mother ceramic green sheet. In this case, a plurality of internal electrodes 4 shown in FIG. 3A are arranged in a matrix pattern. In FIG. 1A, the relationship between adjacent internal electrodes is standardized by that between plural internal electrodes 4A, 4B, and 4C. Also, in FIG. 1B, for clear description, e.g., internal electrodes 5A, 5B, and 5C are referred to as plural internal electrodes 5.

As seen in FIG. 1A, the internal electrode 4A and the internal electrodes 4B and 4C positioned on both of the sides of the internal electrode 4A in the leading-out direction are formed so as to be separated from each other. That is, the lead-out electrodes 4a and 4b of the internal electrode 4A and the lead-out electrodes 4c and 4d of the internal electrode 4B adjacent to the internal electrode 4A are not continuous with each other, respectively. In this case, the lead-out electrodes 4a and 4b of the internal electrode 4A and the lead-out electrodes 4c and 4d of the internal electrode 4B are alternately arranged in the direction where the lead-out electrodes are extended, i.e., in the direction where the side surfaces 2a and 2b shown in FIG. 2 are extended. Therefore, a window portion which is surrounded by an area having conductive paste coated therein is not formed between the internal electrodes 4A and 4B. In addition, similarly, no window portion is formed between the internal electrodes 4A and 4C.

Figure 1B:
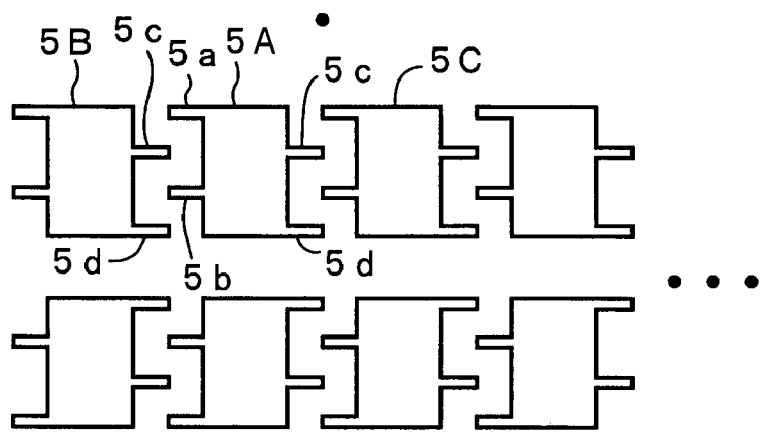

Similarly, in the internal electrode pattern on the second mother ceramic green sheet shown in FIG. 1B, no window portion is formed between the internal electrode 5A and the internal electrodes 5B and 5C adjacent to the internal electrode 5A in the direction where the side surfaces 2a and 2b are connected to each other.

Figure 18:
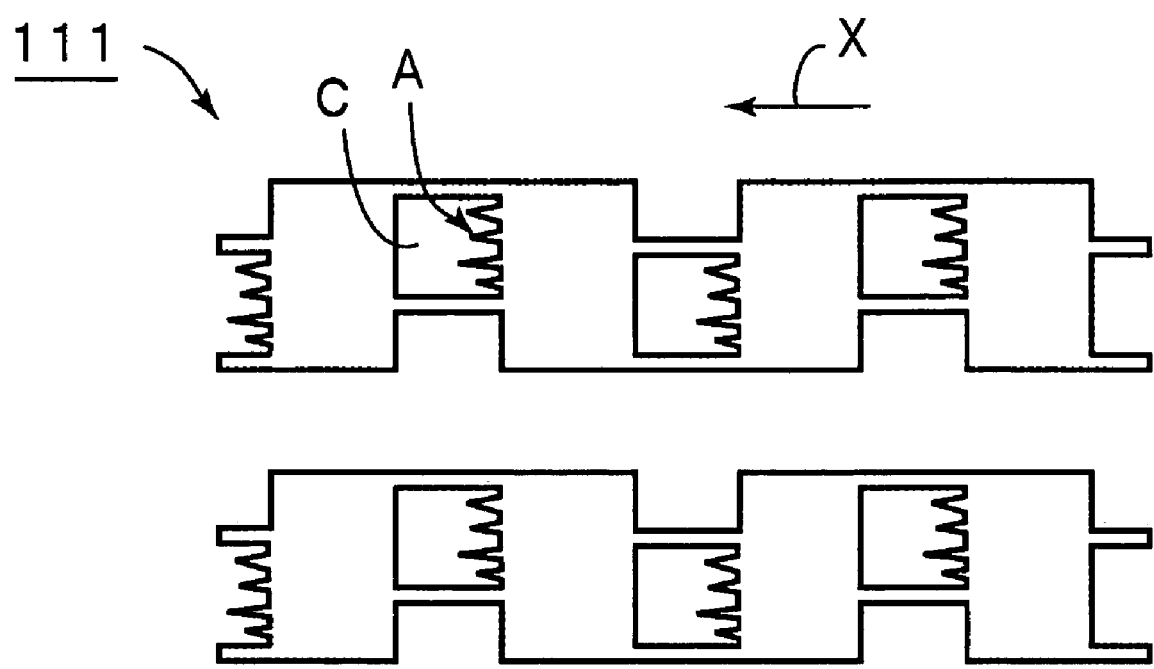
FIG. 18 is a schematic plan view showing the state in which the internal electrode figures spread when the internal electrode patterns are printed according to the known production method.

Therefore, when the internal electrode pattern shown in FIG. 1A is screen-printed on the first mother ceramic green sheet with conductive paste, the printed figures are prevented from spreading. That is, when the conductive paste is applied in the direction shown by arrow X in FIG. 6, the printed figures can be prevented from spreading due to no formation of window portions. Thus, according to the known production method, the printed figures tend to spread due to the formation of the above-described window portion as shown in FIG. 18. According to preferred embodiments of the present invention, the internal electrode pattern can be formed with high accuracy due to no formation of the window portions.

The tips of the lead-out electrodes 4a and 4b of the internal electrode 4A and those of the lead-out electrodes 4c and 4d of the internal electrode 4B adjacent to the internal electrode 4A are set on the same line that is substantially perpendicular to the direction where the lead-out electrodes are extended.

Figure 4:
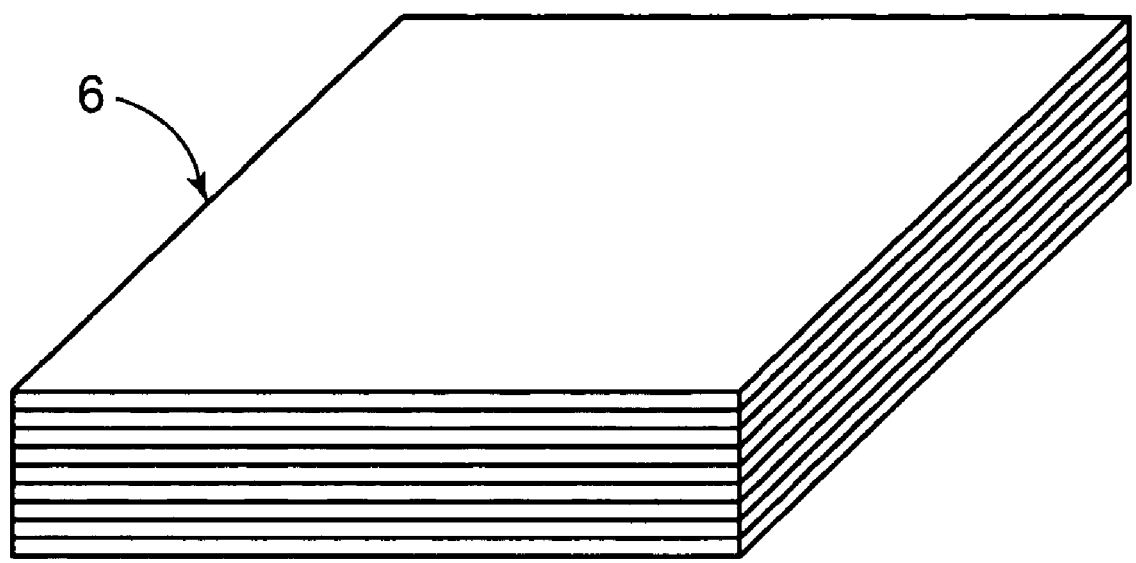
FIG. 4 is a perspective view of the mother laminate formed according to the first preferred embodiment of the present invention.

Subsequently, the first and second mother ceramic green sheets on which the internal electrodes shown in FIGS. 1A and 1B are printed, respectively, are alternately laminated. Thus, a mother laminate shown in FIG. 4 is formed. The mother laminate is pressed in the thickness direction of the laminate, and is cut along chain lines D and E shown in FIG. 5. Thus, laminate chips are formed which are the respective laminate ceramic capacitor units.

Figure 1C:
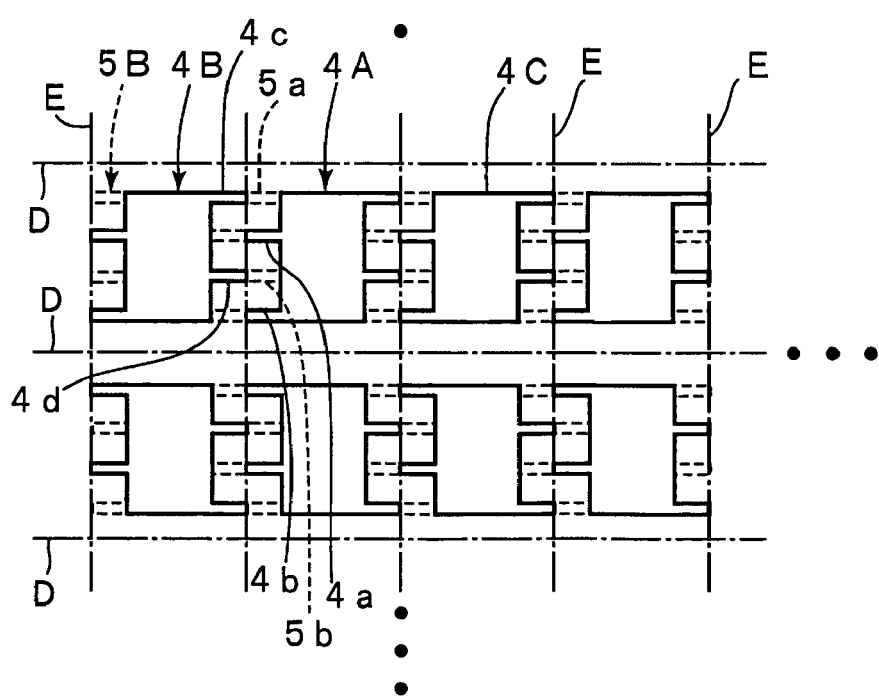
FIG. 1C is a schematic cross-sectional plan view of a formed mother laminate which illustrates the state of the stacked internal electrode patterns.

Regarding the above-described mother laminate 6, the internal electrode pattern of an upper layer and the internal electrode pattern of the lower layer are laminated in such a manner as shown in FIG. 1C.

In particular, the internal electrode 5 of the lower layer is laminated so as to be positioned under the internal electrode 4 of the lower layer via the ceramic green sheet.

Figure 5:
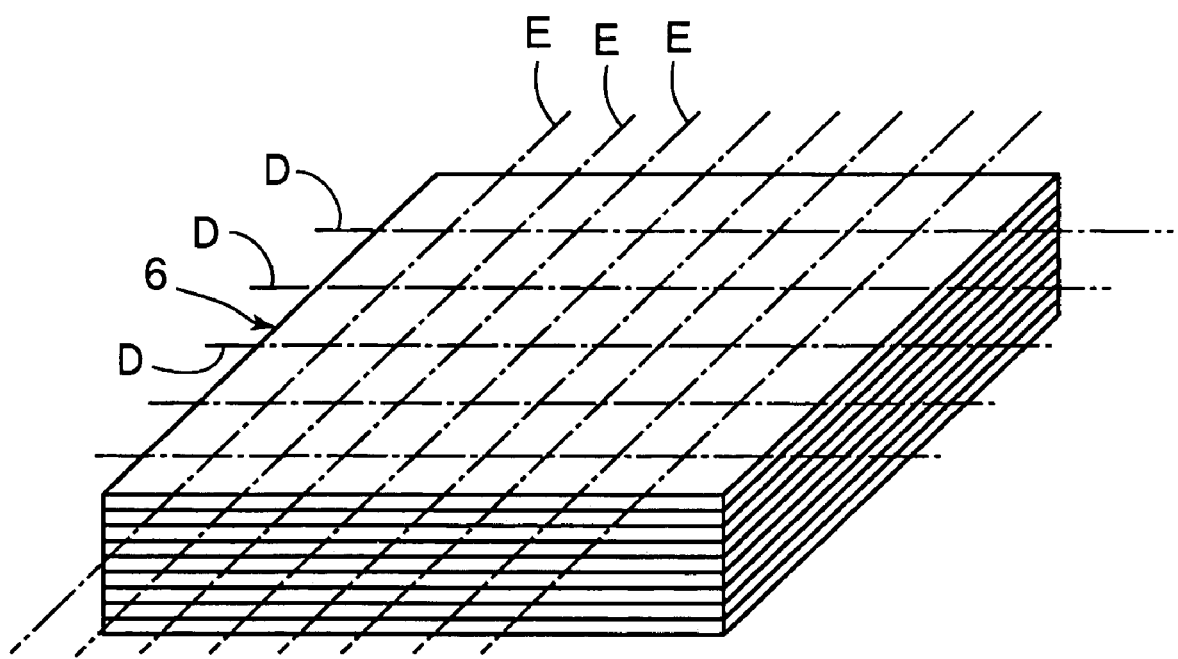
FIG. 5 is a perspective view illustrating a process of cutting the mother laminate.
Figure 6:
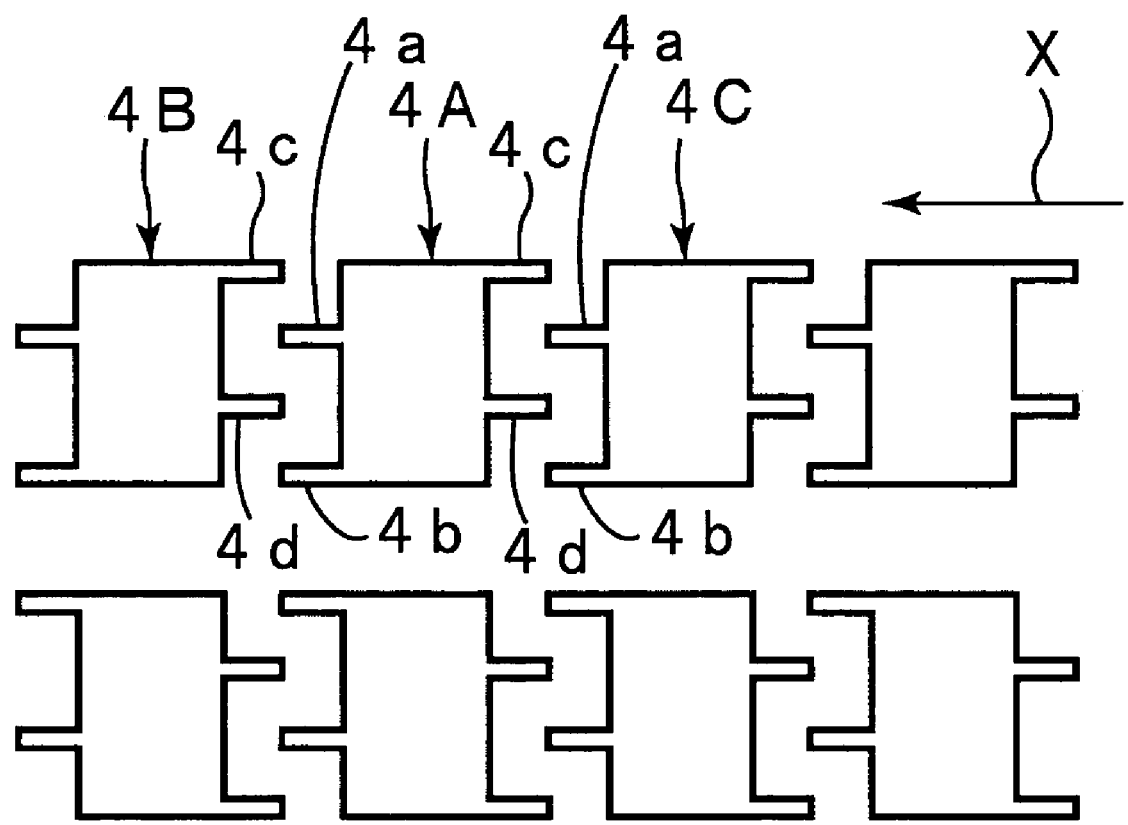
FIG. 6 is a perspective plan view of the internal electrodes which illustrates the reason why spreading of the printed figures can be reliably prevented when the internal electrode patterns are printed according to the first preferred embodiment of the present invention.

It is to be noted that the chain lines D and E shown in FIG. 1C correspond to the chain lines D and E shown in FIG. 5. Therefore, it is seen that the mother laminate 6 is cut along the chain lines D and E as described above, and thereby, the lead-out electrodes 4a to 4d and 5a to 5d are exposed at the cut surfaces.

The laminate chips, which are the respective multi-terminal type ceramic capacitor units formed as described above, are fired. Thus, a sintered member 2 shown in FIG. 2 is formed. Then, the terminal electrodes 3a to 3h are formed by the application and baking of conductive paste. Thus, the multi-terminal monolithic ceramic capacitor 1 is obtained.

Referring to the formation of the terminal electrodes 3a to 3h, after the laminate is formed, the conductive paste may be applied on the outer surfaces of the laminate, and is baked when the laminate is fired, whereby the terminal electrodes 3a to 3h are formed.

Moreover, regarding the formation of the terminal electrodes 3a to 3h, other methods such as vapor deposition, sputtering, plating, and so forth may be used in addition to the application and baking of conductive paste.

According to the method of producing the multi-terminal monolithic ceramic capacitor 1 of this preferred embodiment, the respective internal electrodes can be formed with very high accuracy in the printing of the internal electrode patterns, since no window portions are formed between adjacent internal electrodes in the internal electrode patterns formed on the mother ceramic green sheets as described above. Thus, a multi-terminal type monolithic ceramic capacitor can be formed, in which the dispersion of the characteristics is reduced, adjacent internal electrodes are prevented from being shortcircuited, the characteristics are stable, and the reliability is high.

Second Preferred Embodiment

Figure 7A:
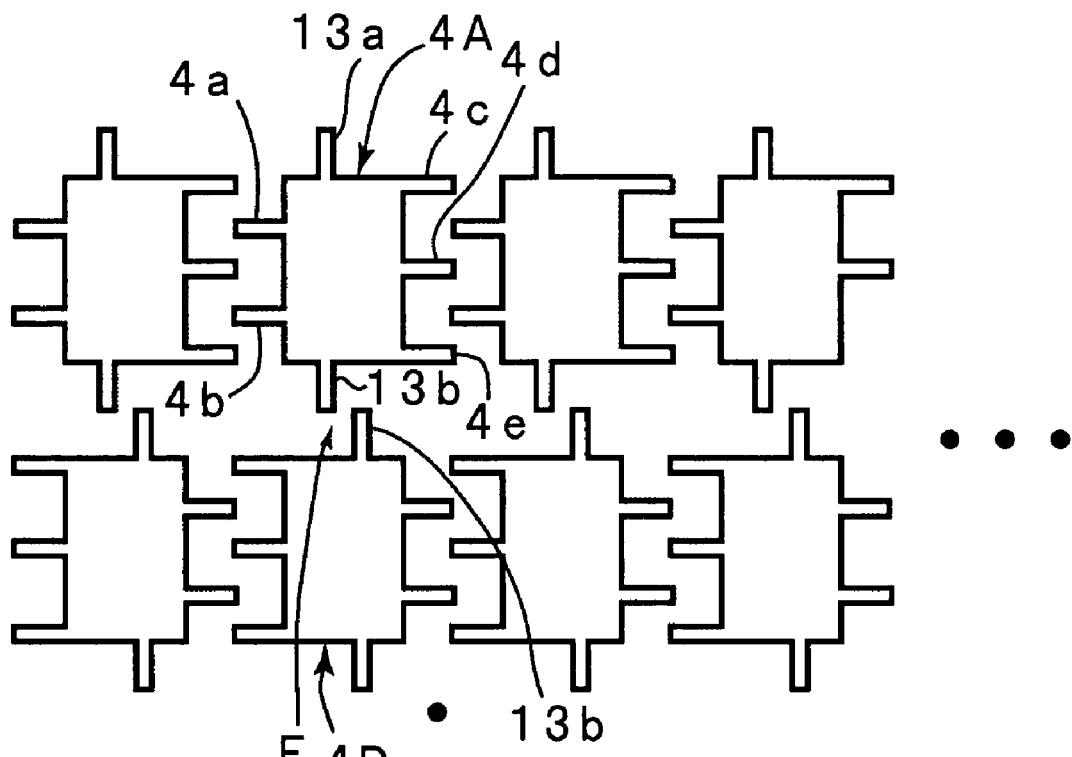
FIGS. 7A and 7B are plan views of the internal electrode patterns formed on the first and second mother ceramic green sheets according to a second preferred embodiment of the present invention.
Figure 7B:
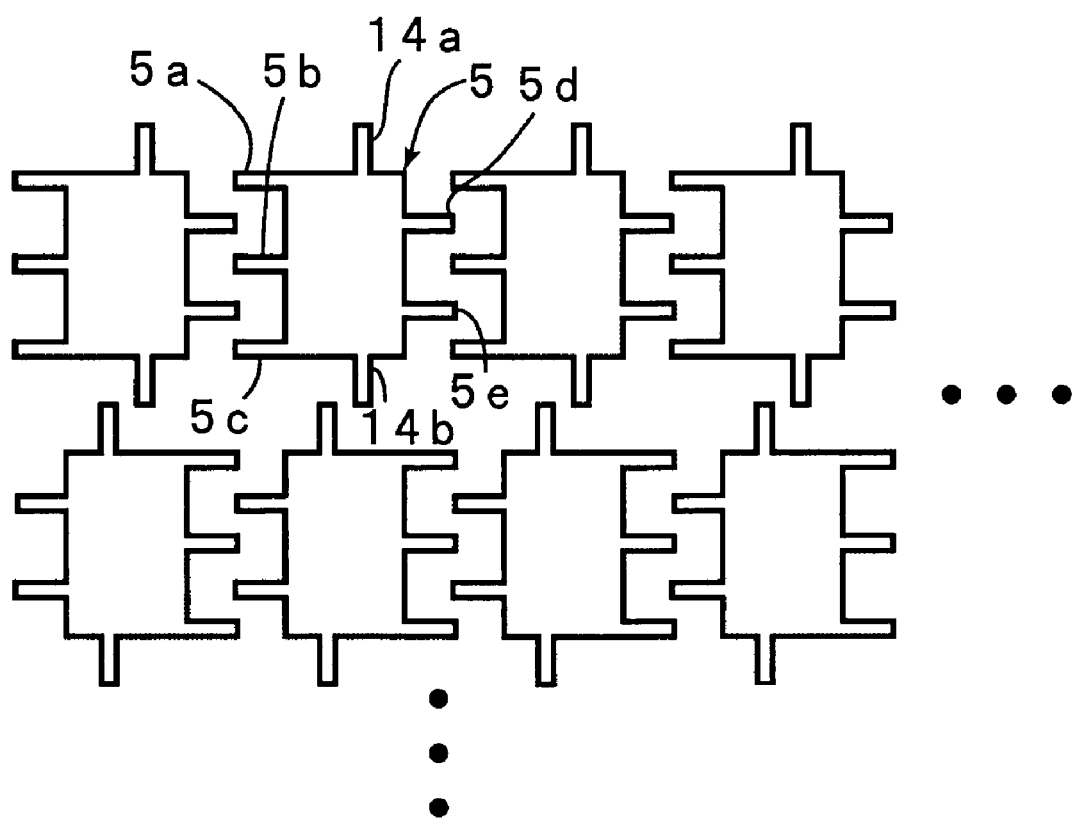
Figure 8:
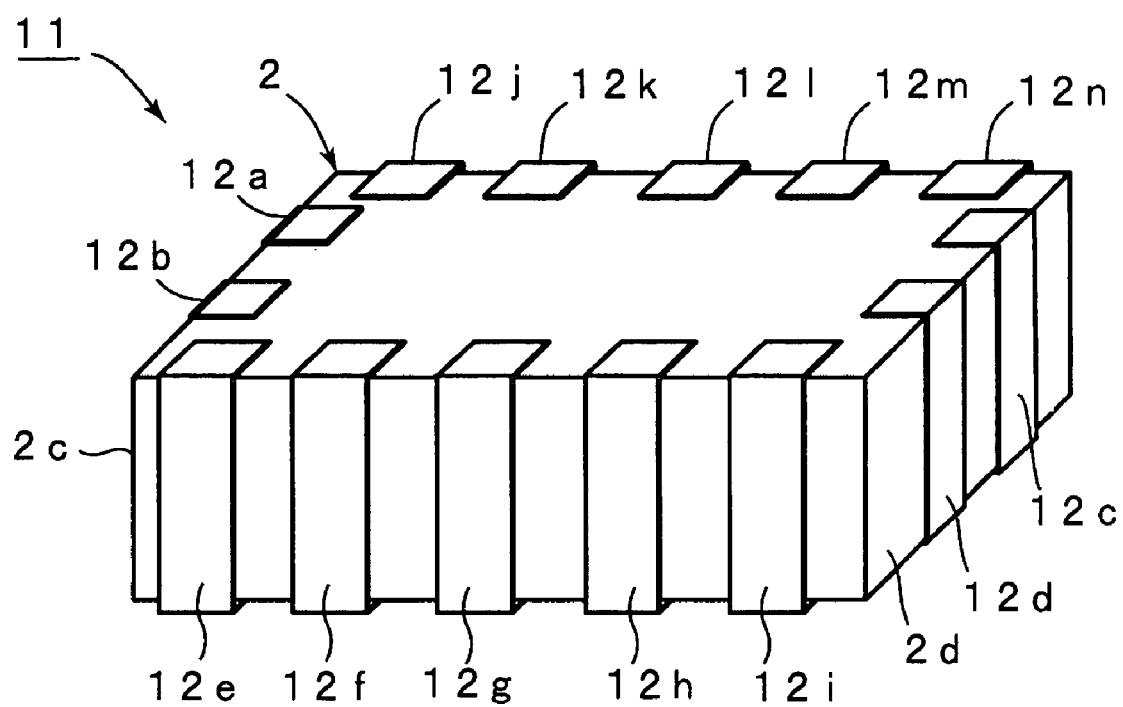
FIG. 8 is a perspective view of a multi-terminal type monolithic ceramic capacitor formed according to the second preferred embodiment of the present invention.

FIGS. 7A and 7B are schematic plan views showing internal electrode patterns which are formed according to the production method of a second preferred embodiment of the present invention. FIG. 8 is a perspective view of a multi-terminal type monolithic ceramic capacitor which is produced according to the second preferred embodiment of the present invention.

In the multi-terminal monolithic ceramic capacitor 11, third terminal electrodes 12a and 12b are formed on a side surface 2c of the sintered member 2, and fourth terminal electrodes 12c and 12d are formed on a side surface 2d thereof, as shown in FIG. 8.

Moreover, first terminal electrodes 12e to 12i are formed on the side surface 2a of the sintered member 2, and second terminal electrodes 12j to 12n are formed on the side surface 2b thereof.

Thus, a lager number of the terminal electrodes 12e to 12j are formed on the side surface 2a, and a larger number of the terminal electrodes 12j to 12n are formed on the side surface 2b compared to those of the first preferred embodiment of the present invention. Thus, as shown in FIGS. 7A and 7B, the number of lead-out electrodes of an internal electrode 4A led out to the side surface 2a and that of the lead-out electrodes of an internal electrode 5 led out to the side surface 2b are increased. For example, in the case of the internal electrode 4A, the lead-out electrodes 4a and 4b are led out to the side surface 2a and the lead-out electrodes 4c to 4e are led out to the side surface 2b. Similarly, in the internal electrode 5, the lead-out electrodes 5a to 5c are led out to the side surface 2a, and the lead-out electrodes 5d and 5e are led out to the side surface 2b. Moreover, the internal electrodes of the internal electrode patterns are provided with lead-out electrodes led out to the side surfaces 2c and 2d so as to be connected to the terminal electrodes 12a to 12d, respectively. That is, in the internal electrode 4 shown in FIG. 7A, lead-out electrodes 13a and 13b are formed. In the internal electrode 5 shown in FIG. 7A, lead-out electrodes 14a and 14b are formed. In the other respects, the method of producing a monolithic ceramic capacitor according to the second preferred embodiment is preferably the same as the production method of the first preferred embodiment of the present invention.

As seen in the second preferred embodiment, the number of lead-out electrodes led out to the side surfaces 2a and 2b, respectively, is not restricted to the number of lead-out electrodes according to the first preferred embodiment of the present invention. Moreover, according to various preferred embodiments of the present invention, lead-out electrodes may be arranged so as to be led out to the side surfaces 2c and 2d of the sintered member 2.

In the case in which the third lead-out electrodes 13a and 13b and the fourth lead-out electrodes 14a and 14b are provided, it is necessary to separate the lead-out electrode 13b of the internal electrode 4A and the lead-out electrode 13b of the internal electrode 4 which is adjacent to the internal electrode 4A in the direction of a line connecting the side surfaces 2c and 2d to each other, the internal electrodes 4D being formed in the position where the internal electrode 4A is inverted by 180°. In other words, the lead-out electrode 13b of the internal electrode 4A and the lead-out electrode 13b of the internal electrode 4 are separated from each other in the direction intersecting the direction in which the lead-out electrodes 13b and 13b are extended.

Also, according to this preferred embodiment, no window portions are formed between adjacent internal electrodes in the internal electrode patterns formed on the mother ceramic green sheets. Therefore, the respective internal electrodes can be formed with very high accuracy as in the first preferred embodiment of the present invention.

Third Preferred Embodiment

Figure 9A:
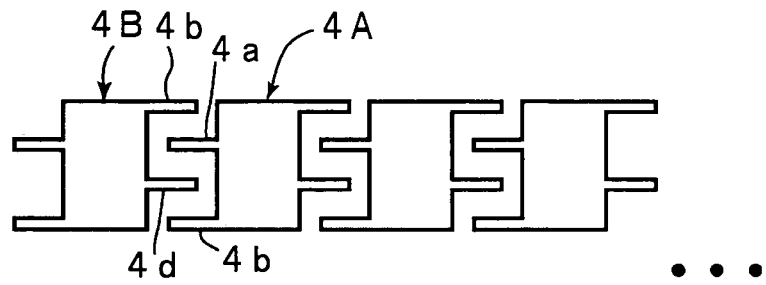
FIGS. 9A and 9B are plan views of the internal electrode patterns formed on the first and second mother ceramic green sheets according to a third preferred embodiment of the present invention.
Figure 9B:
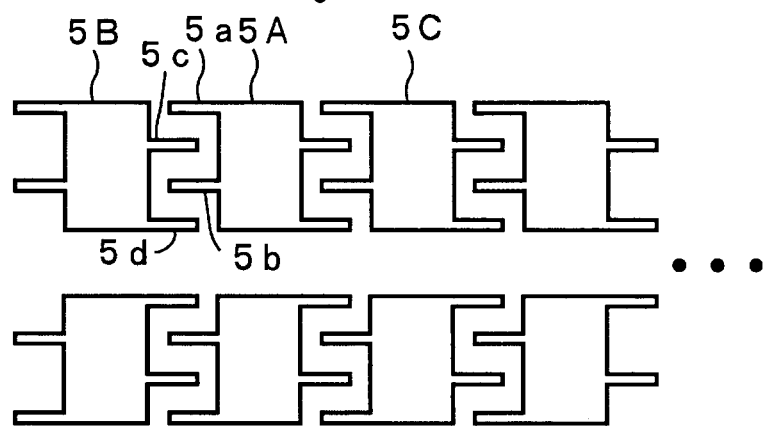
Figure 9C:
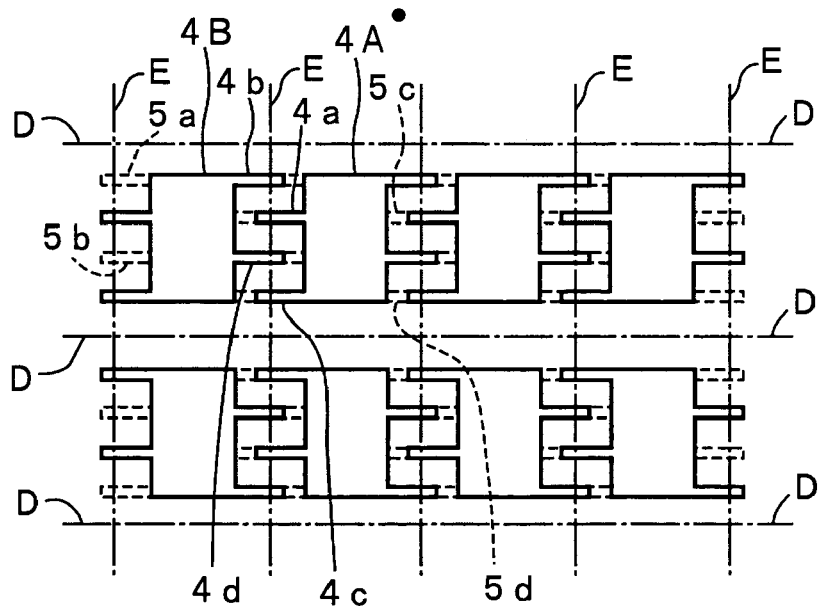
FIG. 9C is a schematic cross-sectional plan view showing the lamination-state of the internal electrode patterns in the mother laminate formed according to the third preferred embodiment of the present invention.

FIGS. 9A to 9C illustrate a method of producing a multi-terminal type monolithic ceramic capacitor according to a third preferred embodiment of the present invention. FIGS. 9A and 9B are plan views showing internal electrode patterns to be laminated onto the each other. FIG. 9C is a schematic plan view showing the lamination of the internal electrode patterns in the mother laminate. FIGS. 9A to 9C correspond to FIGS. 1A to 1C in the first preferred embodiment of the present invention.

One of the unique features of the third preferred embodiment lies in that the lead-out electrodes of the lengths of internal electrodes adjacent to each other are different from those of the lead-out electrodes in the first preferred embodiment of the present invention. This will be described with respect to the internal electrodes 4A and the internal electrodes 4B shown in FIG. 9A as examples. The tips of the lead-out electrodes 4a and 4b of the internal electrode 4A and the tips of the lead-out electrodes 4c and 4d of the internal electrode 4B are extended to the opponent internal electrode sides extending past the center line between the internal electrodes 4A and 4B. In other words, the lead-out electrodes 4a and 4b of the internal electrode A and the lead-out electrodes 4c and 4d of the internal electrode 4B are arranged so as to be interdigitated. In other internal electrodes adjacent to each other, the tips of the lead-out electrodes existing between the internal electrodes are set as described above.

Moreover, similarly, in the internal electrode pattern including a plurality of internal electrodes 5 formed on the second mother green sheet, the internal electrodes 5A to 5C are arranged such that the lead-out electrodes 5a and 5b and the lead-out electrodes 5c and 5d are interdigitated between the internal electrodes as shown in FIG. 9B.

Accordingly, as seen in the schematic plan view of FIG. 9C, when the formed mother laminate is cut along chain lines D and E, the lead-out electrodes 4a to 4d and the lead-out electrodes 5a to 5d are cut on their way. As a result, at the height where the internal electrodes 4 are formed in the formed laminates which are the monolithic ceramic capacitor units, the tip portions of the lead-out electrodes of the adjacent internal electrodes are cut, so that dummy electrodes 21 to 24 are formed. Similarly, at the height where the internal electrodes 5 are formed, dummy electrodes are formed. These are shown in the cross-sectional plan view of FIG. 10A and in the cross-sectional view of FIG. 10B taken along a perpendicular direction relative to the side surfaces of the laminate.

The third preferred embodiment is preferably the same as the first preferred embodiment except that the lead-out electrodes 4a to 4d and 5a to 5d are arranged in such a manner that the dummy electrodes are formed as described above. The same elements are designated by the same reference numerals. The description is not repeated.

According to this preferred embodiment, the lead-out electrodes 4a to 4d and 5a to 5d are extended past the center line between the adjacent internal electrodes. Thus, even if the cutting margin in the chain line E direction is small, the lead-out electrodes 4a to 4d and 5a to 5d of the internal electrodes are reliably exposed at the side surfaces thereof.

Figure 10A:
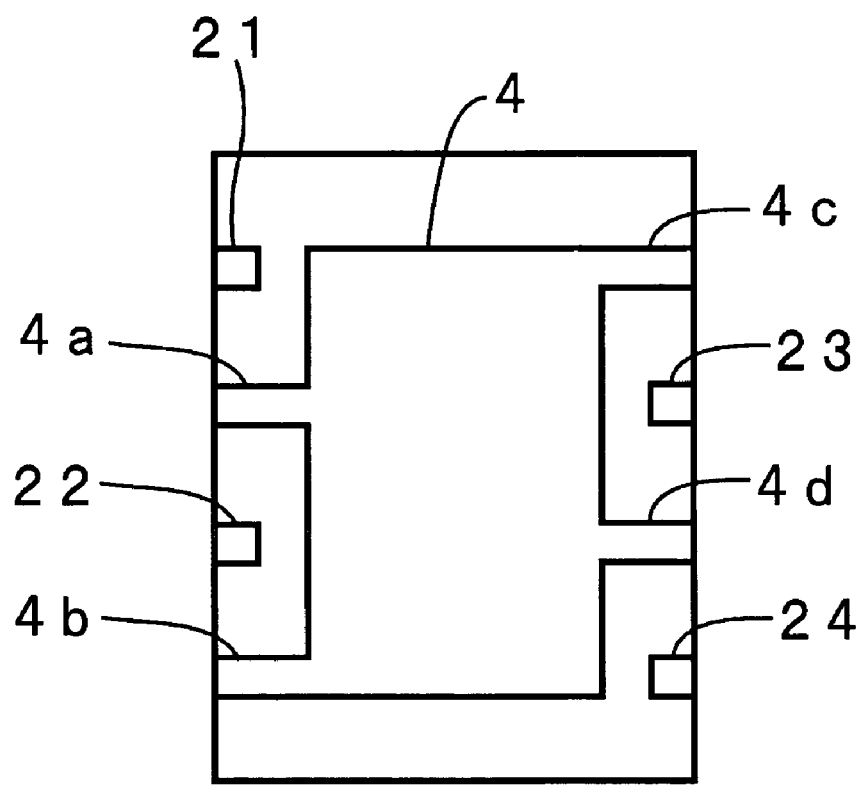
FIG. 10A is a cross-sectional plan view of a laminate which is a monolithic ceramic capacitor unit formed according to the third preferred embodiment of the present invention.
Figure 10B:
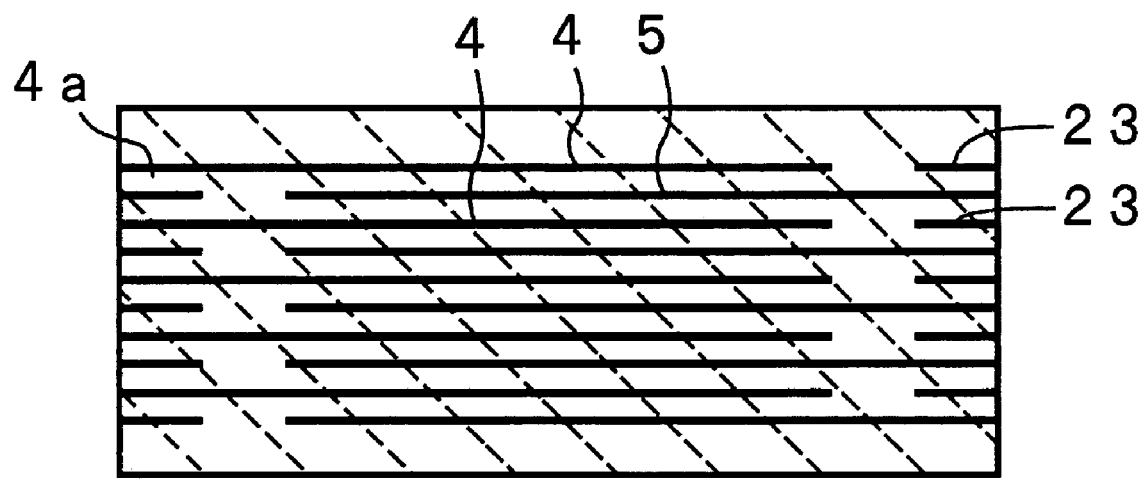
FIG. 10B is a transversely cross-sectional view of the laminate.

In addition, since the dummy electrodes 21 to 24 are formed, the bonding strengths of the terminal electrodes formed on the sintered member 2 can be greatly improved. In particular, the lead-out electrodes 4a and 4b shown in FIG. 10A are connected to the terminal electrodes 3b and 3d (FIG. 2), respectively. On the other hand, the dummy electrodes 21 and 22 overlap, in the vertical direction, the lead-out electrodes 5a and 5b of the internal electrodes 5 laminated on and beneath the internal electrode 4. Thus, the terminal electrodes 3a and 3c (FIG. 2) are connected to the lead-out electrodes 5a and 5b of the internal electrode 5. Accordingly, in the case where the dummy electrodes 21 and 22 are formed, the dummy electrodes 21 and 22 also are connected to the terminal electrodes 3a and 3c. Therefore, the bonding strengths of the terminal electrodes 3a and 3c to the sintered member 2 can be greatly improved by the bonding between the dummy electrodes 21 and 22 and the terminal electrodes 3a and 3c, respectively.

Similarly, the dummy electrodes exist in the internal electrodes 5 formed on and beneath the lead-out electrodes 4a and 4b. Thus, the bonding strengths between the terminal electrodes 3b and 3d and the sintered member 2 are greatly improved.

Fourth Preferred Embodiment

Figure 11A:
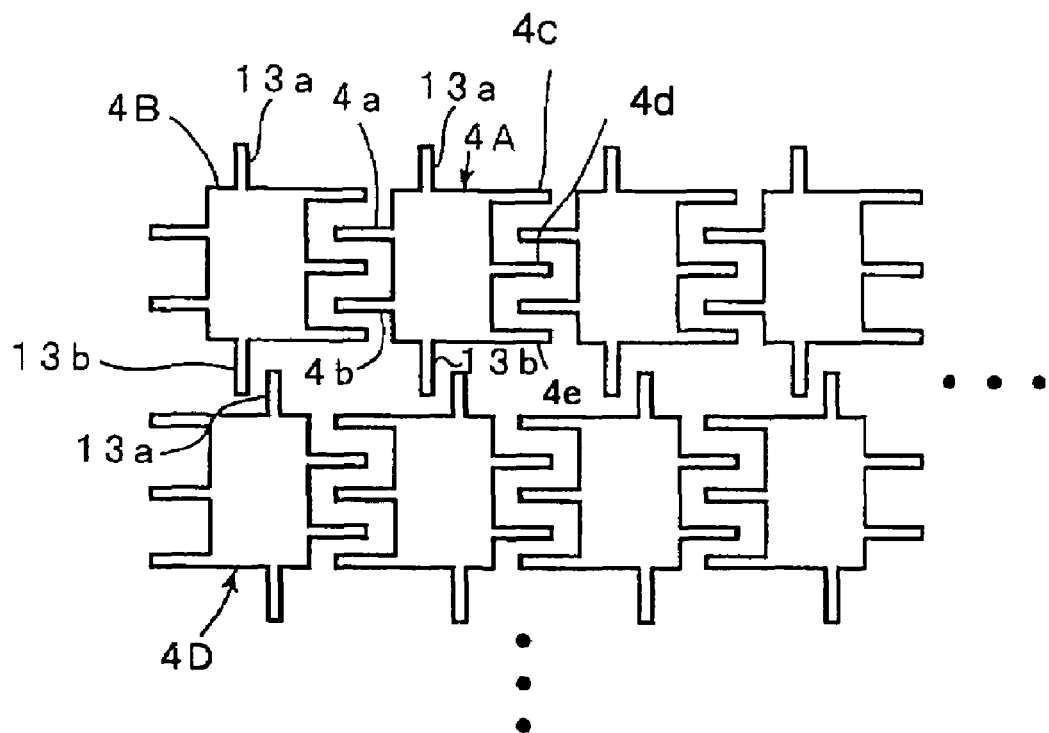
FIGS. 11A and 11B are plan views of internal electrode patterns printed on the first and second mother ceramic green sheets formed according to a fourth preferred embodiment of the present invention.
Figure 11B:
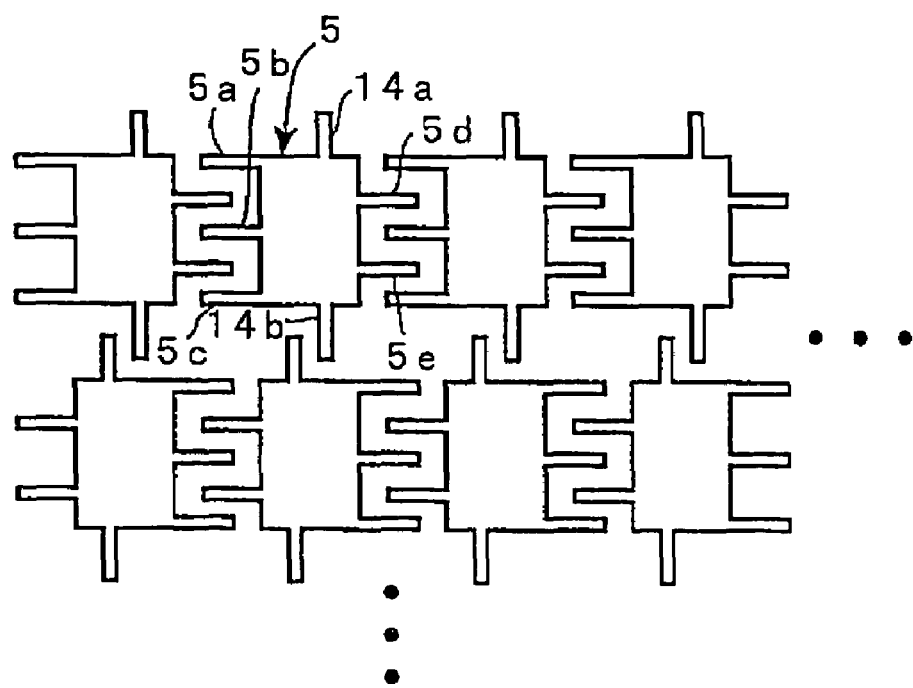

FIGS. 11A and 11B illustrate a method of producing a multi-terminal type monolithic ceramic capacitor according to a fourth preferred embodiment of the present invention. FIGS. 11A and 11B are schematic plan views of the internal electrode patterns formed on the first and second mother ceramic green sheets, respectively. According to the fourth preferred embodiment, the internal electrodes constituting the respective internal electrode patterns are provided with lead-out electrodes 13a, 13b, 14a, and 14b extended in the direction of a line connecting the side surfaces 2c and 2d of the sintered member 2 (see FIG. 2). The lead-out electrode 13a of the internal electrode 4 and the lead-out electrode 14b of the internal electrode 5 adjacent to the internal electrode 4 in the direction of a line connecting the side surfaces 2c and 2d are extended to the opponent sides past the center line between the internal electrodes 4 and 5.

Moreover, similarly to the second preferred embodiment, the internal electrode 4A is provided with lead-out electrodes 4a and 4b led out to the side surface 2a and lead-out electrodes 4c to 4e led out to the side surface 2b. The internal electrode 5 is provided with lead-out electrodes 5a to 5c led out to the side surface 2a and lead-out electrodes 5d and 5e led out to the side surface 2b. In the other configurations, the fourth preferred embodiment is preferably the same as the third preferred embodiment.

That is, according to the production method of the third preferred embodiment, lead-out electrodes 13a, 13b, 14a, and 14b led out to the side surfaces 2c and 2d may be provided for the internal electrodes 4 and 5, respectively. For example, the fourth preferred embodiment is different from the second preferred embodiment in that the tips of the adjacent lead-out electrodes 13b and 13a of the internal electrodes 4B and 4D are extended past the center line between the adjacent internal electrodes 4B and 4D. Therefore, the lead-out electrodes 13b and 13a can be reliably exposed at the cut surfaces by cutting the chain line D. Moreover, the tip portions formed by the cutting function as dummy electrodes. Similarly to the dummy electrode 21 according to the third preferred embodiment, the dummy electrodes formed by cutting the lead-out electrodes 13a, 13b, 14a, and 14b function so that the bonding strengths between the terminal electrodes formed on the side surfaces 2c and 2d and the sintered member 2 are greatly improved.

Fifth Preferred Embodiment

FIGS. 12A to 12C illustrate a production method according to a fifth preferred embodiment of the present invention. FIGS. 12A to 12C correspond to FIGS. 1A to 1C presented in the first preferred embodiment, respectively. That is, FIGS. 12A and 12B show the internal electrode patterns formed on the first and second ceramic green sheets, respectively. FIG. 12C is a schematic cross-sectional plan view of the formed mother laminate.

The fifth preferred embodiment is different from the first preferred embodiment in that as shown in FIG. 12A, in the fifth preferred embodiment, the lead-out electrodes 4*a* and 4*b* of the internal electrode 4A are formed so that the tips thereof do not reach the center line between the adjacent internal electrodes 4A and 4B. Similarly, the lead-out electrodes 4*c* and 4*d* are formed so as not to be extended to the center line between the adjacent internal electrodes. As shown in FIG. 12A, the internal electrode 5 is formed in a manner similar to the internal electrode 4.

Thus, according to this preferred embodiment, no window portion is formed between internal electrodes adjacent to each other in the direction of a line connecting the side surfaces 2*a* and 2*b*. Therefore, the internal electrodes 4 and 5 can be printed with high accuracy, similarly to the first to fourth preferred embodiments of the present invention.

Also, according to the fifth preferred embodiment, in the mother laminate obtained by the lamination, the tips of the lead-out electrodes 4*a* and 4*b* of the internal electrode 4A and the tips of the lead-out electrodes 4*c* and 4*d* of the internal electrode adjacent to the internal electrode 4B, as shown in FIG. 12C, do not reach the center line between the internal electrodes 4A and 4B. Similarly, the tips of the lead-out electrodes 5*a* and 5*b* of the internal electrode 5 and the tips of the lead-out electrodes 5*c* and 5*d* of the internal electrode 5B adjacent to the internal electrode 5 in the direction of a line connecting the side surfaces 2*c* and 2*d* do not reach the center line between the internal electrodes 5 and 5B.

Accordingly, when the laminate chips which are the individual monolithic ceramic capacitor units are formed by cutting along chain lines D and E in FIG. 12C, probably, the lead-out electrodes 3*a* to 4*d* and 5*a* to 5*d* are not exposed to the cut surfaces. However, by setting a cut-margin to be so large that the lead-out electrodes 4*a* to 4*d* and 5*a* to 5*d* are exposed at the side surfaces 2*a* and 2*b*, the lead-out electrodes 4*a* to 4*d* and 5*a* to 5*d* can be reliably exposed at the side surfaces 2*c* and 2*d* which are formed by the cutting.

Moreover, according to this preferred embodiment, upper and lower lead-out electrodes in the lamination direction are prevented from overlapping each other. Thus, advantageously, deformation of the lead-out electrodes and interlayer peeling phenomena can be prevented. This will be described with reference to FIGS. 13A, 13B, 14A, and 14B.

Figure 13A:
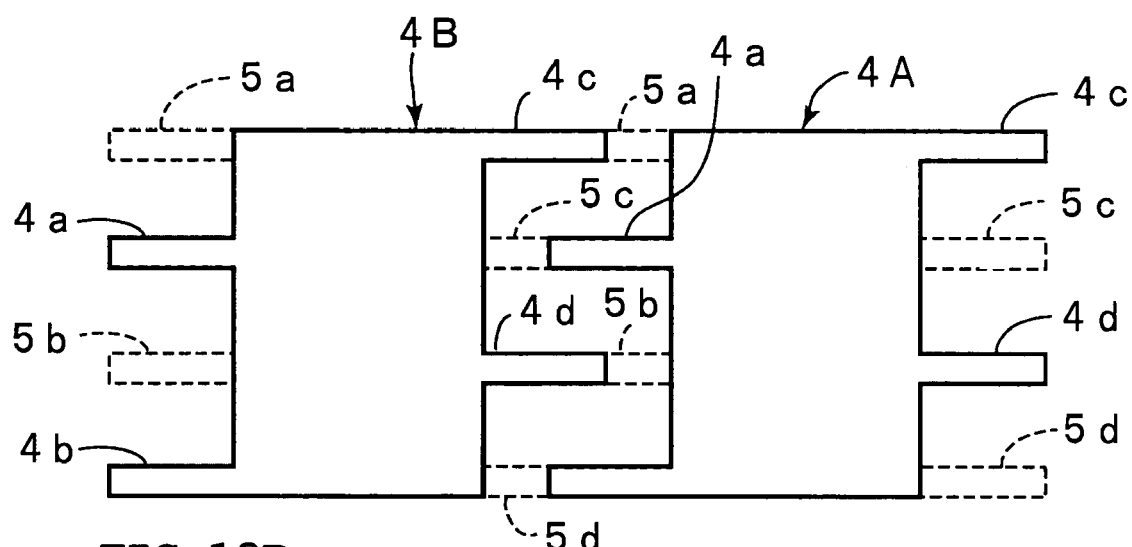
FIG. 13A is a schematic plan view showing the overlapping state of the lead-out electrodes of upper and lower internal electrodes formed by the production method according to the first preferred embodiment of the present invention.
Figure 13B:
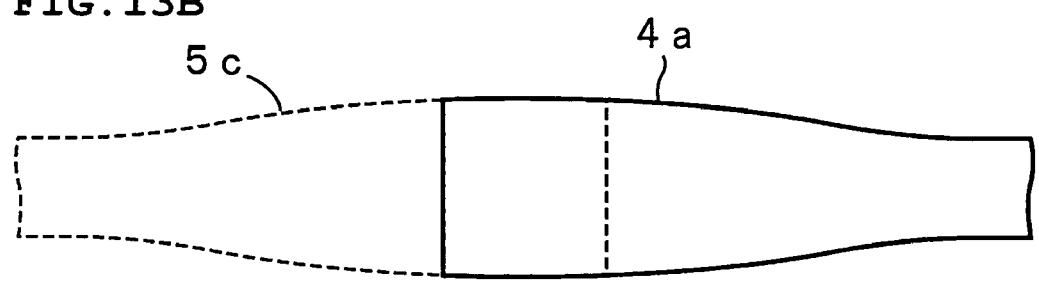
FIG. 13B is a partially cut-away enlarged plan view showing the state in which the upper and lower lead-out electrodes are distorted by pressing.

According to the first preferred embodiment, the adjacent internal electrodes 4A and 4B are arranged as shown in FIG. 13A. Thus, in the case in which the first and second mother ceramic green sheets are laminated, the top portions of the upper lead-out electrodes 4*a* and 4*b* and the top portions of the lead-out electrodes 5*d* and 5*d* connected to the lower internal electrode 5 overlap each other via the ceramic green sheet. Accordingly, when the mother laminate is pressed in the lamination direction, a larger pressure is applied to the area where the lead-out electrode 4*a* and the lead-out electrode 5*c* overlap each other. Thus, the top portions of the lead-out electrodes 4*a* and 5*c* may be distorted so as to extend in the width direction as shown in FIG. 13B. Moreover, the ways of applying pressure in the above-described area and in the other area are different from each other. Thereby, delamination may occur from the side surfaces formed by the cutting.

Figure 14A:
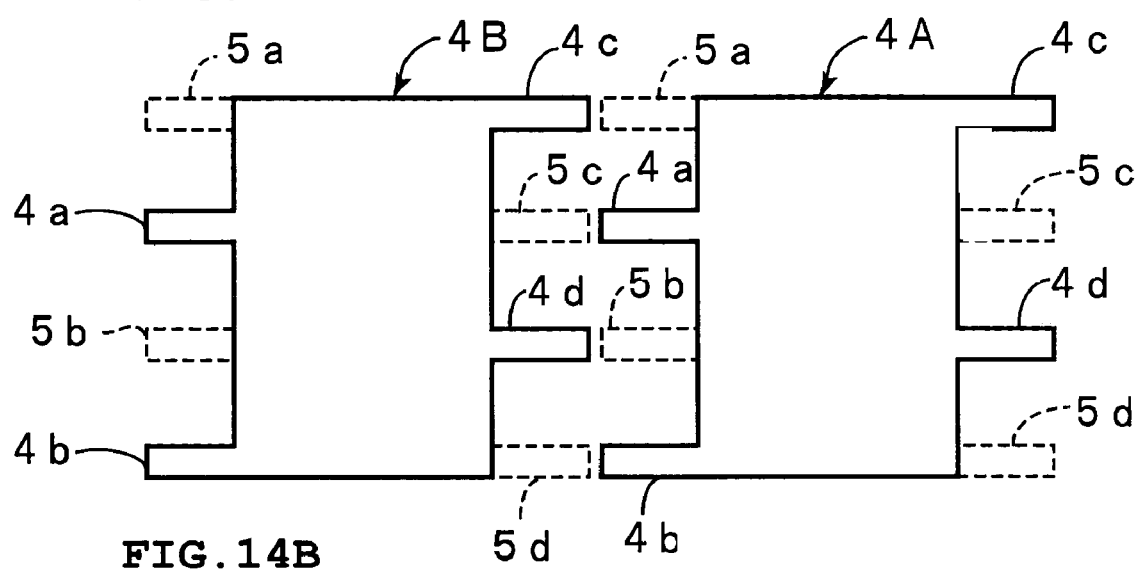
FIG. 14A is a schematic plan view showing the positional relationship between the lead-out electrodes of upper and lower internal electrodes formed according to a fifth preferred embodiment of the present invention.
Figure 14B:
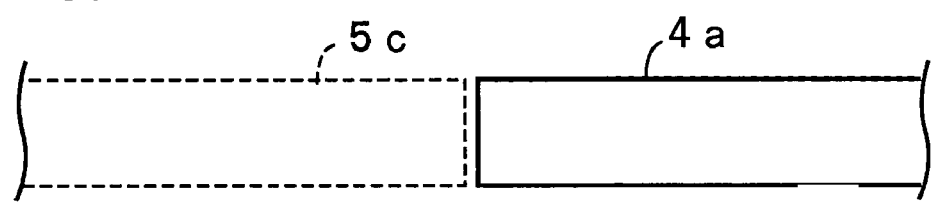
FIG. 14B is a partially cut-away enlarged plan view showing that the upper and lower lead-out electrodes do not overlap each other.

On the other hand, according to this preferred embodiment, as shown in FIG. 14A, the lead-out electrodes of the internal electrodes 4A and 4B are formed as described above. Therefore, for example, the tips of the lead-out electrodes 4*a* and 4*c* of the internal electrode 4A do not overlap the lead-out electrodes 5*b* and 5*d* of the internal electrode pattern set at the lower position. Accordingly, when the mother laminate is pressed in the thickness direction, the lead-out electrode 4*a* is prevented from being distorted, since the lead-out electrodes 4*a* does not overlap the lead-out electrode 5*c* of the internal electrode 5 of the lower internal electrode pattern as shown in FIG. 14B. Moreover, pressure is prevented from being applied in the vicinity of the side surface of the respective monolithic ceramic capacitor units formed by the cutting. Thus, delamination is prevented from occurring.

Sixth Preferred Embodiment

Figure 15A:
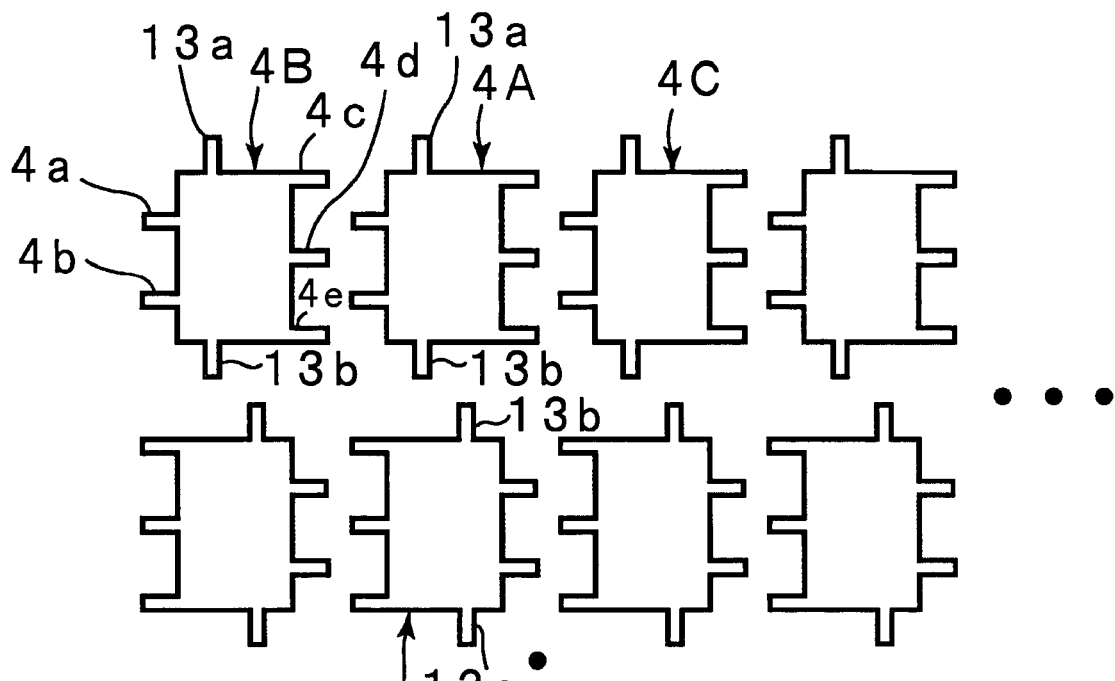
FIGS. 15A and 15B are plan views of internal electrode patterns formed on the first and second ceramic green sheets according to a sixth preferred embodiment of the present invention.
Figure 15B:
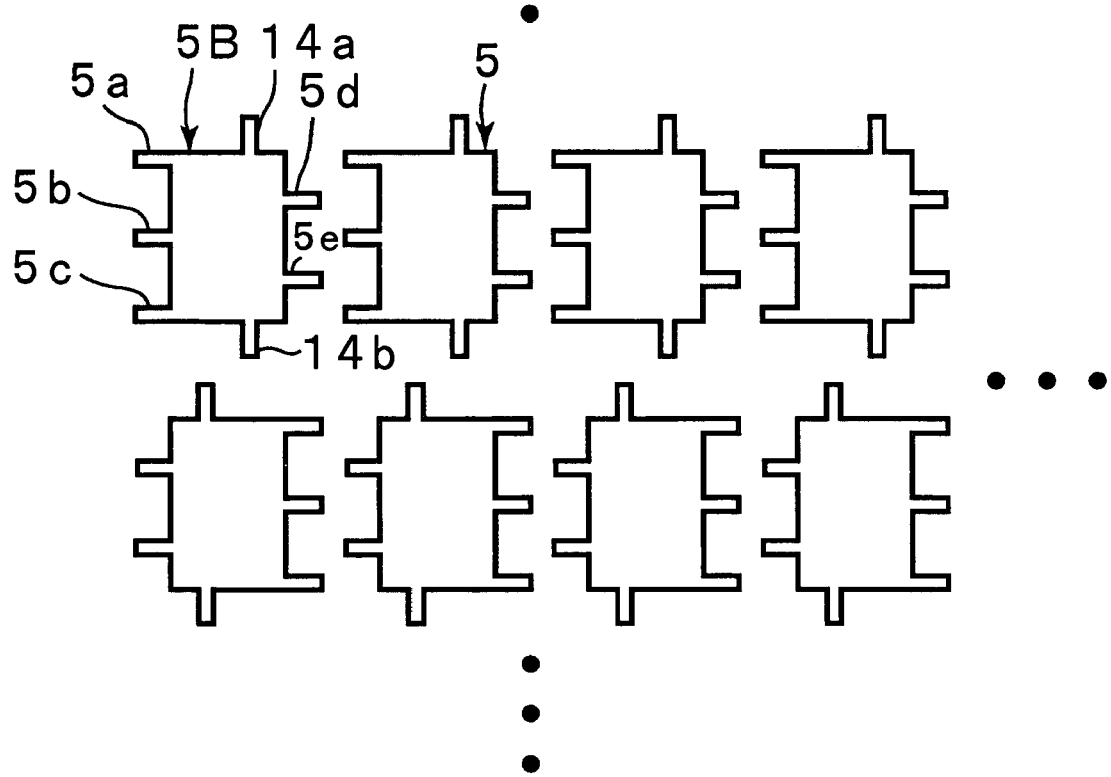
Figure 16:
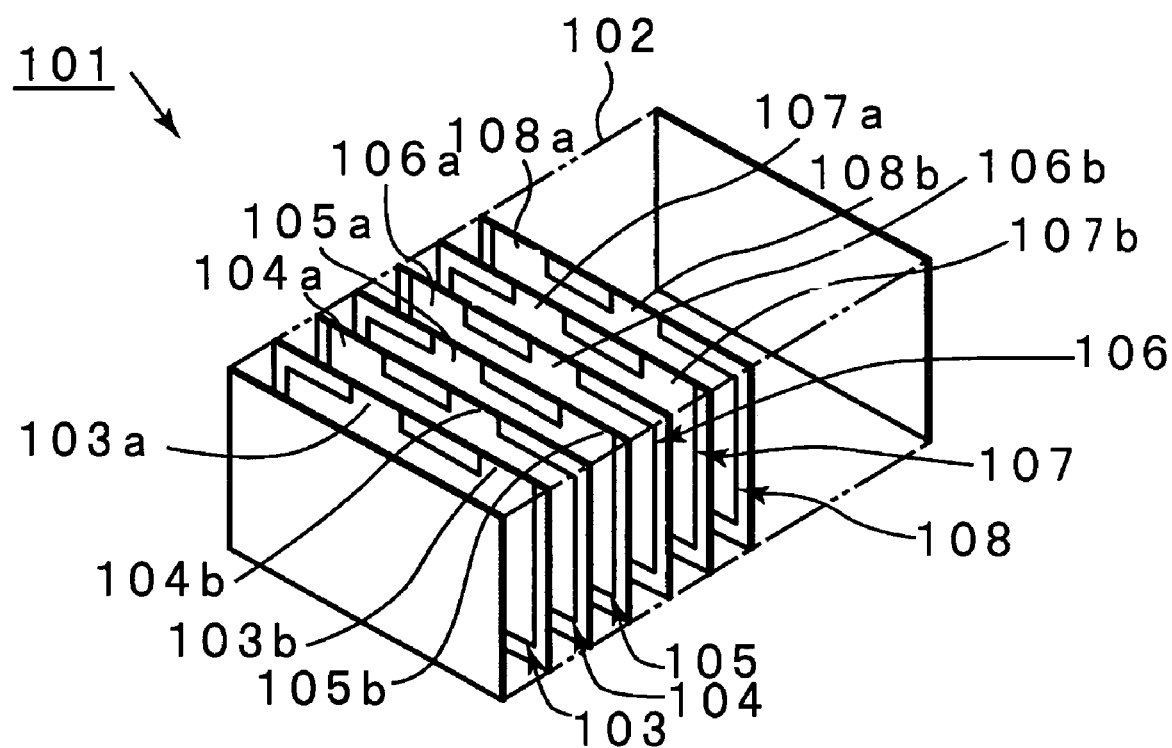
FIG. 16 is a schematic perspective view of a known multi-terminal type monolithic ceramic capacitor.
Figure 17A:
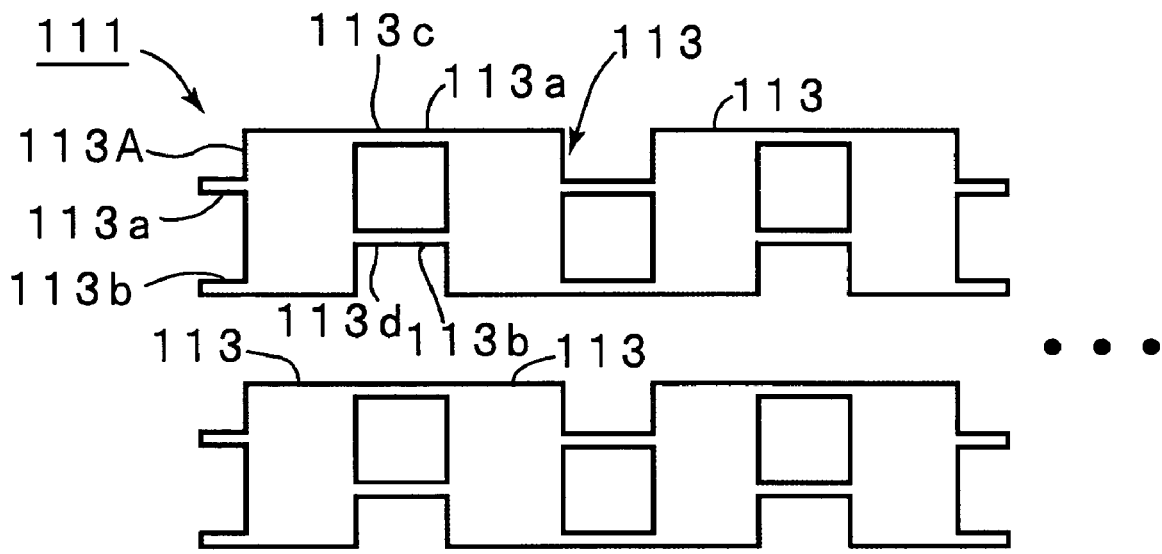
FIGS. 17A and 17B are plan views of internal electrode patterns printed on the first and second mother ceramic green sheets according to a known method of producing the multi-terminal type monolithic ceramic capacitor.
Figure 17B:
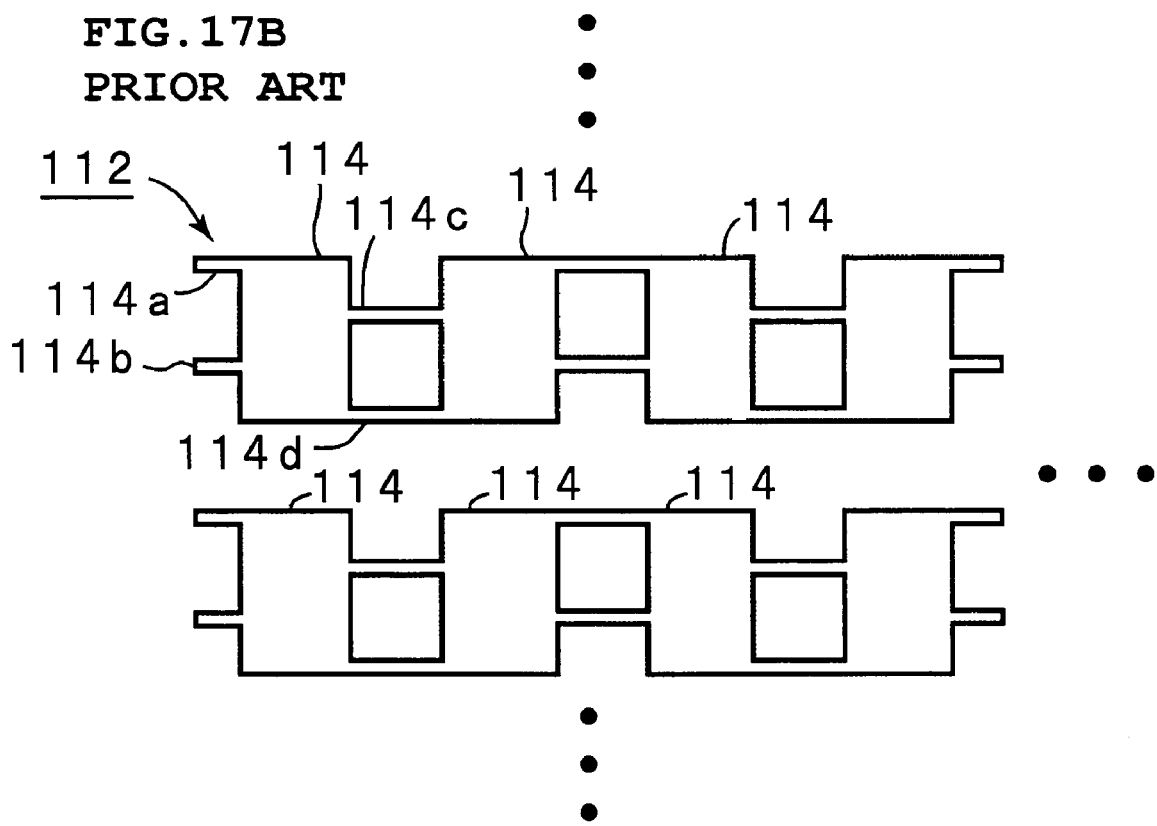

FIGS. 15A and 15B illustrate a production method according to a sixth preferred embodiment of the present invention, and correspond to FIGS. 1A and 1B presented in the first preferred embodiment of the present invention.

According to the sixth preferred embodiment, in the internal electrode patterns formed on the first and second mother ceramic green sheets, the lead-out electrodes 13*a*, 13*b*, 14*a*, and 14*b* of the internal electrodes 4A to 4C, 5, and 5B are led out to the side surfaces 2*c* and 2*d* of the sintered ceramic member 2. For example, in the internal electrode 4A, the lead-out electrodes 4*a* and 4*b* are led out to the side surface 2*a*, and the lead-out electrodes 4*c* to 4*e* are led out to the side surface 2*b*. Similarly, in the case of the internal electrodes 5 and 5B, the lead-out electrodes 5*a* to 5*c* are led out to the side surface 2*a*, and the lead-out electrodes 5*d* and 5*e* are led out to the side surface 2*b*. In other configurations, the sixth preferred embodiment is preferably the same as the fifth preferred embodiment of the present invention.

According to this preferred embodiment, the internal electrode 4A and the internal electrode 4D adjacent to the internal electrode 4A in the direction where the side surfaces 2*c* and 2*d* are extended are formed in such a manner that the lead-out electrodes 13*b* of both of the internal electrodes 4A and 4D are prevented from reaching the center line between them. As seen in the above description, in the fifth preferred embodiment, the lead-out electrodes 13*a* to 14*b* led out to the side surfaces 2*c* and 2*d* may be further provided. Moreover, the lead-out electrodes 13*a*, 13*b*, 14*a*, and 14*b* are formed so as not to reach the center line between adjacent internal electrodes 4 and 5. Therefore, the distortion on the sides of the side surfaces 2*c* and 2*d*, which may be caused by the pressing on the lead-out electrodes, can be prevented. In addition, the delamination on the side surfaces 2*c* and 2*d* can be prevented.

In the first to sixth preferred embodiments, the multi-terminal type monolithic ceramic capacitors are described. The present invention can be also applied to other multi-terminal type laminated ceramic electronic components other than monolithic ceramic capacitors.

The shapes viewed in the plan of the internal electrodes are not restricted to the substantially rectangular ones which are shown in the drawings. Other shapes such as squares may be used.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A method of producing a multi-terminal type laminated ceramic electronic component which includes a sintered ceramic member having a plurality of internal electrodes embedded therein, plural first terminal electrodes formed on a first side surface of the sintered ceramic member, and plural second terminal electrodes formed on the second side surface opposed to the first side surface, the internal electrodes each having plural first lead-out electrodes led out to the first side surface and plural second lead-out electrodes led out to the second side surface, the method comprising the steps of:
preparing a mother green sheet having an internal electrode pattern printed thereon, the internal electrode pattern having a plurality of the internal electrodes formed in a matrix pattern, a shape of the internal electrodes in one row of the matrix pattern is different from a shape of the internal electrodes in an adjacent row of the matrix pattern;
laminating a plurality of the mother ceramic green sheets, and laminating mother ceramic green sheets having no internal electrode patterns printed thereon onto the upper and lower surfaces of the formed laminate, whereby a mother laminate is formed;
cutting the mother laminate in a thickness direction thereof, whereby laminate chips which are the respective multi-terminal type laminated ceramic electronic component units are formed;
firing the laminate chips whereby the sintered ceramic members are formed; and
forming the first and second terminal electrodes before or after the firing of the laminate chips; wherein
the plural second lead-out electrodes of one of adjacent internal electrodes in each internal electrode pattern not being continuous with the first lead-out electrode of the other internal electrode, the plural second lead-out electrodes and the plural first lead-out electrodes being alternately arranged in the direction of a line extending substantially parallel to the first and second side surface; and
each of the internal electrodes in the one row has substantially the same shape and each of the internal electrodes in the adjacent row has substantially the same shape.

2. A method of producing a multi-terminal type laminated ceramic electronic component according to claim 1, wherein in the step of laminating a plurality of the mother ceramic green sheets having the internal electrode patterns formed thereon, a plurality of the mother ceramic green sheets are laminated in such a manner that the positions of the first and second lead-out electrodes of an internal electrode in the internal electrode pattern of an upper layer are shifted, in the direction where the first and second side surfaces are extended, from the positions of the first and second lead-out electrodes of the internal electrode formed at the corresponding position in the internal electrode pattern of the lower layer.

3. A method of producing a multi-terminal type laminated ceramic electronic component according to claim 1, wherein the sintered member includes first and second end surfaces connecting the first and second side surfaces, and the internal electrodes each have third and fourth lead-out electrodes led out to the first and second end surfaces.

4. A method of producing a multi-terminal type laminated ceramic electronic component according to claim 1, wherein in the step of preparing a mother green sheet, the internal electrode pattern is screen-printed using a conductive paste.

5. A method of producing a multi-terminal type laminated ceramic electronic component according to claim 1, wherein tips of the lead-out electrodes of the one adjacent internal electrode are extended so as not to be located between the lead-out electrodes of the other internal electrode.

6. A method of producing a multi-terminal type laminated ceramic electronic component according to claim 1, wherein the step of forming the first and second terminal electrodes is performed before the firing of the laminate chips.

7. A method of producing a multi-terminal type laminated ceramic electronic component according to claim 1, wherein the step of forming the first and second terminal electrodes is performed after the firing of the laminate chips.

8. A method of producing a multi-terminal type laminated ceramic electronic component according to claim 1, wherein the internal electrodes in the one row and the internal electrodes in the adjacent row having different shapes are opposed to one another.

9. A method of producing a multi-terminal type laminated ceramic electronic component which includes a sintered ceramic member having a plurality of internal electrodes embedded therein, plural first terminal electrodes formed on a first side surface of the sintered ceramic member, and plural second terminal electrodes formed on the second side surface opposed to the first side surface, the internal electrodes each having plural first lead-out electrodes led out to the first side surface and plural second lead-out electrodes led out to the second side surface, comprising the steps of:
preparing a mother green sheet having an internal electrode pattern printed thereon, the internal electrode pattern having a plurality of the internal electrodes formed in a matrix pattern, a shape of the internal electrodes in one row of the matrix pattern is different from a shape of the internal electrodes in an adjacent row of the matrix pattern;
laminating a plurality of the mother ceramic green sheets, and laminating mother ceramic green sheets having no internal electrode patterns printed thereon onto the upper and lower surfaces of the formed laminate, whereby a mother laminate is formed;
cutting the mother laminate in a thickness direction thereof, whereby laminate chips which are the respective multi-terminal type laminated ceramic electronic component units are formed;
firing the laminate chips whereby the sintered ceramic members are formed; and
forming the first and second terminal electrodes before or after the firing of the laminate chips; wherein
the plural second lead-out electrodes of one of adjacent internal electrodes in each internal electrode pattern not being continuous with the first lead-out electrode of the other internal electrode, the tips of the lead-out electrodes of the one internal electrode being extended so as to be located between the lead-out electrodes of the other internal electrode; and
each of the internal electrodes in the one row has substantially the same shape and each of the internal electrodes in the adjacent row has substantially the same shape.

10. A method of producing a multi-terminal type laminated ceramic electronic component according to claim 9, wherein in the step of laminating a plurality of the mother ceramic green sheets having the internal electrode patterns formed thereon, a plurality of the mother ceramic green sheets are laminated in such a manner that the positions of the first and second lead-out electrodes of an internal electrode in the internal electrode pattern of an upper layer are shifted, in the direction where the first and second side surfaces are extended, from the positions of the first and second lead-out electrodes of the internal electrode formed at the corresponding position in the internal electrode pattern of the lower layer.

11. A method of producing a multi-terminal type laminated ceramic electronic component according to claim 9, wherein the sintered member includes first and second end surfaces connecting the first and second side surfaces, and the internal electrodes each have third and fourth lead-out electrodes led out to the first and second end surfaces.

12. A method of producing a multi-terminal type laminated ceramic electronic component according to claim 9, wherein in the step of preparing a mother green sheet, the internal electrode pattern is screen-printed using a conductive paste.

13. A method of producing a multi-terminal type laminated ceramic electronic component according to claim 9, wherein the plural second lead-out electrodes and the plural first lead-out electrodes are alternately arranged in the direction of a line connecting the first and second side surfaces.

14. A method of producing a multi-terminal type laminated ceramic electronic component according to claim 9, wherein the step of forming the first and second terminal electrodes is performed before the firing of the laminate chips.

15. A method of producing a multi-terminal type laminated ceramic electronic component according to claim 9, wherein the step of forming the first and second terminal electrodes is performed after the firing of the laminate chips.

16. A method of producing a multi-terminal type laminated ceramic electronic component according to claim 9, wherein the internal electrodes in the one row and the internal electrodes in the adjacent row having different shapes are opposed to one another.

17. A method of producing a multi-terminal type laminated ceramic electronic component which includes a sintered ceramic member having a plurality of internal electrodes embedded therein, plural first terminal electrodes formed on a first side surface of the sintered ceramic member, and plural second terminal electrodes formed on the second side surface opposed to the first side surface, the internal electrodes each having plural first lead-out electrodes led out to the first side surface and plural second lead-out electrodes led out to the second side surface, the method comprising the steps of:

preparing a mother green sheet having an internal electrode pattern printed thereon, the internal electrode pattern having a plurality of the internal electrodes formed in a matrix pattern, a shape of the internal electrodes in one row of the matrix pattern is different from a shape of the internal electrodes in an adjacent row of the matrix pattern;

laminating a plurality of the mother ceramic green sheets, and laminating mother ceramic green sheets having no internal electrode patterns printed thereon onto the upper and lower surfaces of the formed laminate, whereby a mother laminate is formed;

cutting the mother laminate in the thickness direction thereof, whereby laminate chips which are the respective multi-terminal type laminated ceramic electronic component units are formed;

firing the laminate chips whereby the sintered ceramic members are formed; and forming the first and second terminal electrodes before or after the firing of the laminate chips; wherein the plural second lead-out electrodes of one of adjacent internal electrodes in each internal electrode pattern not being continuous with the first lead-out electrode of the other internal electrode, the tips of the lead-out electrodes of the one internal electrode being extended so as not to be located between the lead-out electrodes of the other internal electrode; and each of the internal electrodes in the one row has substantially the same shape and each of the internal electrodes in the adjacent row has substantially the same shape.

18. A method of producing a multi-terminal type laminated ceramic electronic component according to claim 17, wherein in the step of laminating a plurality of the mother ceramic green sheets having the internal electrode patterns formed thereon, a plurality of the mother ceramic green sheets are laminated in such a manner that the positions of the first and second lead-out electrodes of an internal electrode in the internal electrode pattern of an upper layer are shifted, in the direction where the first and second side surfaces are extended, from the positions of the first and second lead-out electrodes of the internal electrode formed at the corresponding position in the internal electrode pattern of the lower layer.

19. A method of producing a multi-terminal type laminated ceramic electronic component according to claim 17, wherein the sintered member includes first and second end surfaces connecting the first and second side surfaces, and the internal electrodes each have third and fourth lead-out electrodes led out to the first and second end surfaces.

20. A method of producing a multi-terminal type laminated ceramic electronic component according to claim 17, wherein in the step of preparing a mother green sheet, the internal electrode pattern is screen-printed using a conductive paste.

21. A method of producing a multi-terminal type laminated ceramic electronic component according to claim 17, wherein the plural second lead-out electrodes and the plural first lead-out electrodes are alternately arranged in the direction of a line connecting the first and second side surfaces.

22. A method of producing a multi-terminal type laminated ceramic electronic component according to claim 17, wherein the step of forming the first and second terminal electrodes is performed before the firing of the laminate chips.

23. A method of producing a multi-terminal type laminated ceramic electronic component according to claim 17, wherein the step of forming the first and second terminal electrodes is performed after the firing of the laminate chips.

24. A method of producing a multi-terminal type laminated ceramic electronic component according to claim 17, wherein the internal electrodes in the one row and the internal electrodes in the adjacent row having different shapes are opposed to one another.

* * * * *